(12) United States Patent
Claridge et al.

(10) Patent No.: US 10,479,500 B2
(45) Date of Patent: *Nov. 19, 2019

(54) UNMANNED AERIAL VEHICLE WITH DETACHABLE COMPUTING DEVICE

(71) Applicant: xCraft Enterprises, Inc., Coeur d'Alene, ID (US)

(72) Inventors: Jerry Daniel Claridge, Sandpoint, ID (US); Charles Fischer Manning, Sandpoint, ID (US)

(73) Assignee: xCraft Enterprises, Inc., Coeur d'Alene, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,835

(22) Filed: Aug. 21, 2017

(65) Prior Publication Data

US 2018/0170539 A1    Jun. 21, 2018

Related U.S. Application Data

(63) Continuation of application No. 14/658,689, filed on Mar. 16, 2015, now Pat. No. 9,738,380.

(51) Int. Cl.
    *B64C 1/30*      (2006.01)
    *B64C 39/02*     (2006.01)
    (Continued)

(52) U.S. Cl.
    CPC ............ *B64C 39/024* (2013.01); *A63H 27/12* (2013.01); *B64C 1/30* (2013.01); *B64C 19/00* (2013.01);
    (Continued)

(58) Field of Classification Search
    CPC ......... B64C 39/024; B64C 1/30; B64C 19/00; B64C 27/08; B64C 2201/024;
    (Continued)

(56) References Cited

U.S. PATENT DOCUMENTS

| 2,328,786 A | 9/1943 | Crowser |
| 3,081,964 A | 3/1963 | Quenzler |

(Continued)

FOREIGN PATENT DOCUMENTS

| CN | 101886927 | 11/2010 |
| CN | 104062979 A | 9/2019 |
| DE | 102013011378 A1 | 1/2015 |

OTHER PUBLICATIONS

Ackerman, "A Smartphone is the Brain for this Autonomous Quadcopter", retrieved on May 18, 2016 at >>http://spectrum.ieee.org/automation/robotics/drones/a-smartphone-is-the-brain-for-this-autonomous-quadcopter>>, IEEE Spectrum, Jan. 31, 2015, 1 page.

(Continued)

*Primary Examiner* — Gertrude Arthur Jeanglaude
(74) *Attorney, Agent, or Firm* — Perkins Coie LLP

(57) ABSTRACT

This disclosure is generally directed to an Unmanned Aerial Device (UAV) that uses a removable computing device for command and control. The UAV may include an airframe with rotors and an adjustable cradle to attach a computing device. The computing device, such as a smart phone, tablet, MP3 player, or the like, may provide the necessary avionics and computing equipment to control the UAV autonomously. For example, the adjustable cradle may be extended to fit a tablet or other large computing device, or retracted to fit a smart phone or other small computing device. Thus, the adjustable cradle may provide for the attachment and use of a plurality of different computing devices in conjunction with a single airframe. Additionally the UAV may comprise adjustable arms to assist in balancing the load of the different computing devices and/or additional equipment attached to the airframe.

26 Claims, 15 Drawing Sheets

(51) Int. Cl.

| | |
|---|---|
| *B64C 19/00* | (2006.01) |
| *B64C 27/08* | (2006.01) |
| *A63H 27/00* | (2006.01) |
| *G05D 1/00* | (2006.01) |
| *G05D 1/10* | (2006.01) |
| *G08G 5/04* | (2006.01) |
| *H04B 1/3827* | (2015.01) |

(52) U.S. Cl.
CPC ........... *B64C 27/08* (2013.01); *G05D 1/0088* (2013.01); *G05D 1/101* (2013.01); *G08G 5/045* (2013.01); *H04B 1/3833* (2013.01); *B64C 2201/024* (2013.01); *B64C 2201/027* (2013.01); *B64C 2201/108* (2013.01); *B64C 2201/141* (2013.01)

(58) Field of Classification Search
CPC ........ B64C 2201/027; B64C 2201/108; B64C 2201/141; A63H 27/12; G05D 1/0088; G05D 1/101; G08G 5/045; H04B 1/3833
USPC .......................................................... 701/3
See application file for complete search history.

(56) References Cited

U.S. PATENT DOCUMENTS

| | | | |
|---|---|---|---|
| 3,096,952 | A | 7/1963 | Roppel |
| 3,120,359 | A | 2/1964 | Sprecher |
| 3,184,184 | A | 5/1965 | Dorman |
| 3,350,035 | A | 10/1967 | Schlieben |
| 3,514,052 | A | 5/1970 | McKeown |
| 5,289,994 | A | 3/1994 | Del Campo-Aguilera |
| 5,589,901 | A | 12/1996 | Means |
| 6,445,983 | B1 | 9/2002 | Dickson et al. |
| 6,561,455 | B2 | 5/2003 | Capanna |
| 8,170,728 | B2 | 5/2012 | Roesch |
| 8,356,770 | B2 | 1/2013 | Parks |
| 8,616,492 | B2 | 12/2013 | Oliver |
| 9,075,415 | B2 | 7/2015 | Kugelmass |
| 9,409,645 | B1 | 8/2016 | Sopper et al. |
| 9,738,380 | B2 * | 8/2017 | Claridge ................. B64C 19/00 |
| 9,994,313 | B2 | 6/2018 | Claridge |
| 2002/0074452 | A1 | 6/2002 | Ingram |
| 2005/0146458 | A1 | 7/2005 | Carmichael et al. |
| 2005/0178879 | A1 | 8/2005 | Mao |
| 2007/0228221 | A1 | 10/2007 | Segal |
| 2010/0168937 | A1 | 7/2010 | Soijer et al. |
| 2010/0243794 | A1 | 9/2010 | Jermyn |
| 2010/0243821 | A1 | 9/2010 | Lim |
| 2011/0139923 | A1 | 6/2011 | Papanikolopoulos et al. |
| 2011/0168835 | A1 | 7/2011 | Oliver |
| 2011/0288684 | A1 | 11/2011 | Farlow et al. |
| 2012/0026166 | A1 | 2/2012 | Takeda et al. |
| 2013/0238168 | A1 | 9/2013 | Reyes |
| 2013/0251525 | A1 | 9/2013 | Saiz |
| 2014/0008498 | A1 | 1/2014 | Reiter |
| 2014/0151496 | A1 | 6/2014 | Shaw |
| 2014/0180914 | A1 | 6/2014 | Abhyanker |
| 2014/0217229 | A1 | 8/2014 | Chan |
| 2014/0249693 | A1 | 9/2014 | Stark et al. |
| 2014/0288730 | A1 | 9/2014 | Fucke et al. |
| 2014/0297067 | A1 | 10/2014 | Malay |
| 2014/0312177 | A1 | 10/2014 | Gaonjur |
| 2015/0175263 | A1 | 6/2015 | Reyes |
| 2015/0225071 | A1 | 8/2015 | Tighe |
| 2015/0232181 | A1 | 8/2015 | Oakley et al. |
| 2015/0266571 | A1 | 9/2015 | Bevirt |
| 2015/0284079 | A1 | 10/2015 | Matsuda |
| 2016/0376004 | A1 | 12/2016 | Claridge et al. |
| 2016/0378120 | A1 | 12/2016 | Creasman |
| 2018/0290744 | A1 | 10/2018 | Claridge |
| 2019/0135428 | A1 | 5/2019 | Claridge |

OTHER PUBLICATIONS

Office action for U.S. Appl. No. 14/658,689, dated Dec. 6, 2016, Claridge et al., "Unmanned Aerial Vehicle With Detachable Computing Device", 9 pages.
PCT Invitation to Pay Additional Fees dated Mar. 15, 2016 for PCT Application No. PCT/US16/16004, 2 pages.
PCT Search Report and Written Opinion dated Jun. 2, 2016 for PCT Application No. PCT/US16/16004, 14 pages.
Tomkins, "The drone of your dreams: DJI inspires with 4k-shooting, 360-degree, transforming quadcopter", retrieved on Mar. 10, 2016 at <<http://www.imaging-resource.com/news/2014/11/13/drone-of-your-dreams-dji-inspire-4k-360-degree-transforming-quadcopter>>, Nov. 13, 2014, pp. 1-8.
Corrected Notice of Allowability dated Feb. 9, 2018 in U.S. Appl. No. 14/554,982 for Claridge, J.D., 5 pages.
Extended European Search Report dated Jun. 4, 2018 in European Patent Application No. 15862818.0, 9 pages.
Extended European Search Report dated Sep. 21, 2018 in European Patent Application No. 16765374.0, 14 pages.
Final Office Action dated Nov. 18, 2016 in U.S. Appl. No. 14/554,892 for Claridge et al., filed Nov. 26, 2014, 20 pages.
Final Office Action dated Oct. 5, 2017 in U.S. Appl. No. 14/554,892 for Claridge et al., filed Nov. 26, 2014, 12 pages.
First Examination Report dated Aug. 6, 2018 in Australian Patent Application No. 2016233871, 6 pages.
First Examination Report dated Jul. 16, 2018 in Australian Patent Application No. 2015354671, 5 pages.
First Office Action dated May 8, 2019 in Chinese Patent Application No. 201680016062.9, 8 pages.
International Search Report and Written Opinion dated Apr. 8, 2016 in International Patent Application No. PCT/US15/57722, 13 pages.
Kim, N. et al., "LAB: The Living Aerial Bot by LabRomance Inc.—Kickstarterlab-the-living-aeria," Kickstarter.com, Feb. 1, 2015, retrieved from <https://www.kickstarter.com/projects/labromance/lab-the-living-aerial-bot>, 22 pages.
Leichtfried, M. et al., "Autonomous Flight using a Smartphone as On-Board Processing Unit in GPS-Denied Environments," International Conference on Advances in Mobile Computing & Multimedia, 10 pages. date unknown.
Madrigal, "Inside Google's Secret Drone-Delivery Program," retrieved on Nov. 26, 2014 at <http://www.theatlantic.com/technology/archive/2014/08/inside-googles-secret-drone-delivery-program/379306/>, 34 pages.
Non-Final Office Action dated Apr. 4, 2019 in U.S. Appl. No. 16/005,345 for Claridge et al., filed Jun. 11, 2018, 19 pages.
Non-Final Office Action dated Jan. 10, 2019 in U.S. Appl. No. 16/004,924 for Claridge et al., filed Jun. 11, 2018, 18 pages.
Non-Final Office Action dated Mar. 23, 2017 in U.S. Appl. No. 14/554,892 for Claridge et al., filed Nov. 26, 2014, 21 pages.
Non-Final Office Action dated May 6, 2016 in U.S. Appl. No. 14/554,892 for Claridge et al., filed Nov. 26, 2014.
Notice of Allowance dated Jan. 16, 2018 in U.S. Appl. No. 14/554,892, for Claridge et al., filed Nov. 26, 2014, 8 pages.
Notice of Allowance dated Mar. 22, 2017 in U.S. Appl. No. 14/658,689, for Claridge et al., filed Mar. 16, 2015, 5 pages.
Examination Report dated Jun. 25, 2019 in European Patent Application No. 167653740, 7 pages.
First Office Action dated Aug. 26, 2019 in Chinese Patent Application No. 201510828899.0, 8 pages.

* cited by examiner

US 10,479,500 B2

UNMANNED AERIAL VEHICLE WITH DETACHABLE COMPUTING DEVICE

RELATED APPLICATIONS

This application claims priority to and is a continuation of U.S. patent application Ser. No. 14/658,689, filed on Mar. 16, 2015, the entire contents of which are incorporated herein by reference.

BACKGROUND

Unmanned aerial vehicles (UAVs), also known as drones, have become very popular in aviation. The use of UAVs spans from hobby use to large scale military surveillance and strike operations. Because of the widespread use, UAVs of all shapes and sizes are constructed. However, a UAV must be a certain size to carry the payload required of the avionics and computing equipment necessary to fly the UAV autonomously, semi-autonomously, or manually. The requirement for the avionics, computing equipment, and the like also increases the overall cost of building the UAV, thereby making it less accessible to the average consumer.

Despite the cost, the popularity of UAVs in all aspects of aviation continues to increase annually. This increasing popularity has led to a subsequent need for increased safety features in the UAVs to protect other airplanes and people on the ground. For example, because UAVs are unmanned, they lack the inherent ability to see and avoid other objects in their flight path. Additionally, in the event of a loss of communication or power, UAVs may pose a safety risk to people on the ground, as they may be out of control in a landing profile.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 is a side view of the UAV shown in FIG. 1, with an exemplary cradle and computing device case line-up indicator.

FIG. 5 depicts multiple versions of the cradle with adjustable clamps configured to secure a computing device to a UAV.

FIG. 6 depicts the UAV with the arms of the airframe retracted.

DETAILED DESCRIPTION

Overview

Figure 1:
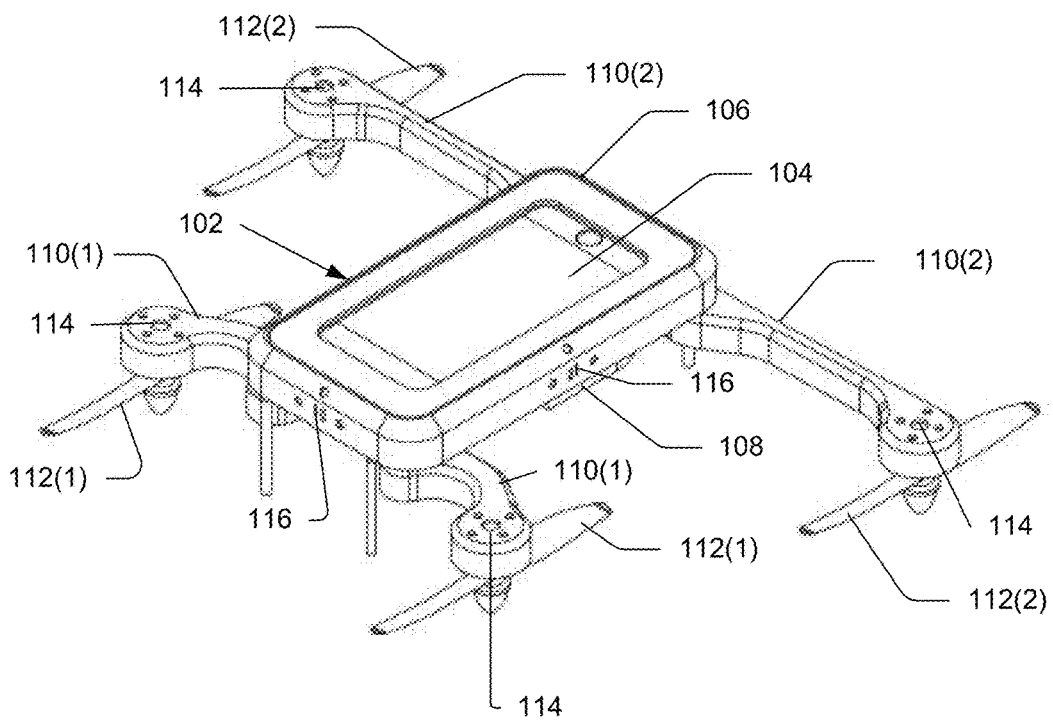
FIG. 1 is a perspective view of an unmanned aerial vehicle (UAV) with a detachable computing device.

This disclosure is generally directed to an Unmanned Aerial Device (UAV) that uses a removable computing device for command and control. As discussed above, UAVs must be of a certain size to carry the avionics and computing equipment necessary to fly autonomously, semi-autonomously, and manually. However, various embodiments described herein provide an improved design in the UAV market. In at least one embodiment, the UAV may include an airframe with rotors and an adjustable cradle to attach a computing device. The computing device, such as, for example, a smart phone, tablet, MP3 player, or the like, may provide the necessary avionics and computing equipment to control the drone autonomously. For example, the adjustable cradle may be extended to fit a tablet or other larger computing device, or retracted to fit a smart phone or other smaller computing device. Thus, the adjustable cradle may provide for the attachment and use of a plurality of different computing devices in conjunction with a single airframe.

Various embodiments of the UAV may include an airframe with adjustable arms, and rotors attached thereto. The arms may fully retract for storage, and may extend for flight. The arms may be adjustable throughout a range of motion in order to balance the center of gravity of the drone when different computing devices are mounted in the cradle. In some embodiments, the arms may be manually placed in set positions for particular computing devices. In various embodiments, the arm positions may be automatically set by a control management system based upon balance inputs from a plurality of sensors.

In accordance with various embodiments, the control management system controls and sustains flight based upon input from a flight management system. The flight management system may be an application or program loaded on a computing device, configured to receive input from various sensors on the computing device, such as accelerometers, gyroscopes, and location sensors (e.g. a global positioning system receiver). In some embodiments, the flight management system may process the inputs, and send the information to the control management system to adjust the arms and/or rotors as necessary to maintain balanced flight.

In various embodiments, the flight management system also comprises a flight plan. The flight plan may comprise a particular waypoint, a series of waypoints, a random set of waypoints, a follow-me feature, or any other route of flight information. The flight plan may include an airspeed or series of airspeeds for the drone to fly throughout the flight plan. Additionally, the flight plan may comprise an altitude, a range of altitudes, or a series of altitude adjustments for the drone to make throughout the flight plan. In various embodiments, the flight management system may send input to the control management system to effect a change in the direction, velocity, orientation, and/or altitude of the drone, as necessary to maintain the flight plan.

In accordance with various embodiments, the flight plan may be input into the flight management system by entering one or more waypoints prior to flight. Each of the waypoints may correspond to a latitude and longitude, a street address, or a position on a grid. The flight plan may be manually generated by inputting position information for one or more waypoints. The flight plan may also be input by downloading a pre-set series of waypoints from a server.

In accordance with various embodiments, the flight plan may be generated during flight. For example, the flying computing device coupled to the airframe may be set to a follow-me mode. The follow-me mode may be configured to maintain a particular distance, a range of distances, altitude, or range of altitudes from a second computing device. Thus, when the second computing device is mobile, the drone, based on input from the flying computing device, will follow the second computing device, generating a flight plan on the fly. Additionally or alternatively, the follow-me mode may be configured to follow a target. For example, the target may comprise one or more of, a computing device, for example, another computing device other than the first or second; an accessory, for example, a wireless headset, watch, wearable, or similar device; an implantable device, for example, a device implanted permanently, semi-permanently, or temporarily into a person or animal; among others; or combinations thereof. Additionally or alternatively, the target may comprise any device that emits a signal actively or passively. For example, an active signal may comprise a Wi-Fi or Bluetooth™ signal, while a passive signal may comprise a signal from an NFC enabled device. Additionally or alternatively, the target may be based on visual, written, shape identification, or combinations thereof. For example, a runner in a race may have a target hairstyle and/or a target race bib number. Additionally or alternatively, a car may have a make, model, license plate number, or combinations thereof.

In accordance with various embodiments, the flight management system may receive no-fly zone input, such as a restricted airspace. For example, a user may want to restrict drone flight over a body of water. The user may map the body of water as a no-fly zone, and consequently the flight management system will fly around the body of water. For another example, the flight management system may receive, from the Federal Aviation Administration, or other pertinent authority (e.g., a neighbor, property owner, local government body, a parent/guardian), a list or map of areas in which flight is prohibited. The flight management system may process that information, and verify that a programmed flight plan does not violate the no-fly zone. In some embodiments, the flight management system may provide a warning to the user if one or more flight plans will breach the boundary of a no-fly zone.

In accordance with various embodiments, the flight management system may receive no-fly time restriction, such as black-out flight times. For example, a parent or guardian may restrict the times in which their child flies the UAV (e.g., to ensure the child does their homework or goes to sleep on time). The flight management system may process the information, and verify that the programmed flight time does not violate the no-fly time restriction. In some embodiments, the flight management system may provide the parent or guardian a warning if an operator attempts to override the no-fly time restriction. Additionally or alternatively, the flight management system may provide an indication that the UAV flight is restricted based upon no-fly time input. For another example, the no-fly time restriction may be implemented by other pertinent authorities in a particular area, such as a property owner, a local government body, or airfield management.

In various embodiments, the UAV may include a plurality of safety features. For example, the drone may include a return-to-base function. The return-to-base function may monitor battery life and determine when the drone must deviate from a flight path when necessary to ensure battery life enough to complete the flight. For another example, the drone may include an ultrasonic sensor configured to detect obstacles, and send signals to the control management system to avoid the obstacles. The safety features mentioned here are not intended to constitute an exhaustive list, but are merely presented as illustrative examples. The safety features discussed here, as well as others, will be presented in greater below.

Illustrative Embodiment

FIG. 1 is a perspective view of an unmanned aerial vehicle (UAV) with a detachable computing device.

The UAV 100 in FIG. 1 has an airframe 102 and a decoupleable computing device 104. The airframe 102 may comprise carbon fiber, titanium, aluminum, plastic, combinations thereof, or any other materials appropriate for aircraft construction. The airframe 102 may comprise a cradle 106, configured to house computing device 104. The computing device 104 may include a personal computing device, such as a telephone, a smart phone, a tablet computer, a hybrid computer, a docking tablet, a two-in-one device, a three-in one device, a personal digital assistant, a smart television, or other similar device. The airframe 102 may also comprise a back plate 108, one or more arms 110, one or more rotors 112, and one or more motors 114 coupled to the one or more rotors 112.

In various embodiments, the components of the UAV 100 may be manufactured via traditional manufacturing techniques. In some embodiments, the components may be manufactured by 3-D manufacturing techniques, injection molding, composite manufacturing, or any other method of manufacturing.

In the illustrative example, the UAV 100 is a quad-copter with four arms 110 and four rotors 112. As depicted in FIG. 1, the fore arms 110(1) and the aft arms 110(2) may be of different lengths, sizes, and/or shapes. In other embodiments, the fore arms 110(1) and the aft arms 110(2) may be the same length, size, and/or shape. In still other embodiments, the UAV 100 may have a lesser or greater number of arms and rotors, such as, for example, a tri-copter or an octo-copter.

In various embodiments, the arms 110 may each house a motor 114. The motors 114 may be coupled to and configured to drive the rotors 112. In some embodiments, UAV 100 may include less than one motor per arm. In such embodiments, the UAV 100 may include one, two, or three motors on the airframe 102, which are coupled to and configured to drive the one or more rotors 112. In other embodiments, the UAV 100 may have four or more motors 114. In such embodiments, the UAV 100 may have one or more motors on each arm and/or at different locations on the airframe 102.

For example, one motor may be coupled to each arm, while one or more motors may be mounted on a different part of the airframe to augment the power produced by the motors mounted on each arm. In some embodiments, the motors may all be coupled to one another to provide redundancy in the case of a motor failure or emergency.

In various embodiments, motors 114 may comprise electric motors. In such embodiments, the electric motors may be powered by any reasonable source of electrical power, such as, for example, lithium-ion batteries, fuel cells, solar power, nuclear power, or a hybrid technology. In some embodiments, motors 114 may comprise ducted fan, jet engines, impellers, turbo-propeller engines, and the like.

The rotors 112 may be coupled to the motors 114 via a rotor shaft. In such embodiments, the motors 114 may produce power which is transmitted to rotors 112 via the rotor shaft in order to produce thrust for propulsion. The rotor shaft may comprise a metal material (e.g., aluminum, steel, stainless steel, titanium, alloys thereof, etc.), a plastic material (e.g., high-density polyethylene, acrylic, melamine, polycarbonate, etc.), a composite material (e.g., fiberglass, carbon fiber, etc.), a wood material, and combinations of the foregoing, among others.

The rotors 112 may comprise a composite material, a wood material, a plastic material, a nylon material, a metallic material, or a combination thereof. In various embodiments, rotors 112 may be variable speed, fixed pitch rotors. In other embodiments, rotors 112 may be variable speed, variable pitch rotors. In yet other embodiments, rotors 112 may be fixed speed, variable pitch rotors. Additionally or alternatively, various embodiments may include one or more of the foregoing rotors used in combination with one or more of a different foregoing rotor, or other propulsion systems. In the illustrative example, each the rotors 112 are the same size (e.g. chord, thickness, and/or wingspan). In other examples, the fore rotors 112(1) may be a different size than the aft rotors 112(2).

In various embodiments, the fore rotors 112(1) may rotate clockwise, while the aft rotors 112(2) may rotate counter-clockwise, or vice versa. In other embodiments, opposing fore rotors 112(1) may be counter rotating, such that one rotates clockwise and the other rotates counter-clockwise. In such embodiments, the opposing aft rotors 112(2) may also be counter-rotating.

In various embodiments, the speed and/or pitch of the rotors may be determined by a control management system based upon input from one or more inertial sensors (e.g., accelerometers, gyroscopes, magnetometers, and the like). The inertial sensors may be located in the computing device 104 and/or coupled to the airframe 102. The inertial sensors may be configured to measure precise positioning data of the UAV 100 along three axes: heading, roll and pitch, and send the positioning data to the control management system.

Responsive to receiving the positioning data, the control management system may send output signals to one or more of the rotors 112, directing each of the rotors 112 to increase and/or decrease speed and/or pitch as necessary to maintain the desired flight regime. In some embodiments, the control management system may send output signals to each motor 110, directing the motors to turn on, turn off, idle, increase, or decrease power. In some embodiments, the control management system may adjust and/or control the orientation of the UAV 100 via the speed and/or pitch of the rotors 112.

In various embodiments, the control management system may be configured to receive flight management input (e.g., direction, velocity, altitude, waypoints, a flight plan, geolocation, etc.) and/or balance input (e.g., input from one or more accelerometers, gyroscopes, magnetometers, etc.) directly from a remote computing device, from a remote computing device via computing device 104, and/or directly from the computing device 104 housed in the cradle 106.

In various embodiments, the cradle 106 may be adjustable, thus making it capable of housing computing devices of different sizes. For example, the cradle 106 may be adjustable to house a tablet, a smartphone, and a smart television, as well as any other type of hand-held personal computing device. In some embodiments, the cradle 106 may comprise an attachment feature and/or device. For example, the cradle may comprise at least one clamp to secure the computing device 104 to the UAV 100. The clamps may be adjustable, and may be configured to adjust manually and/or automatically. Additionally or alternatively, the cradle may comprise hook and loop connectors, an adhesive (e.g. glue or tape), and/or a snap fit connector.

In various embodiments, the clamps may be coupled to an actuator configured to extend and/or retract the clamps. In some embodiments, the clamps may comprise pressure sensors configured to detect a maximum amount of pressure to be applied to the computing device 104. Once the pressure is achieved, the pressure sensor may send a signal indicating maximum pressure and/or sufficient pressure to secure the computing device 104. In embodiments with an actuator, responsive to the signal from the pressure sensor, the actuator may cut off power to the clamps.

In some embodiments, the cradle 106 may be a fixed size. In some embodiments, the cradle 106 may be configured to house a computing device 104 of a particular size. In such embodiments, the computing device may be secured in the cradle 106 by a snap fit, hug fit, or any other type of fitting configured to secure a device into a housing. For example, the cradle 106 may comprise two parts of a case, a bottom part and a top part. The bottom part of the cradle 106 may be coupled to the airframe 102, and may be sized to fit a particular computing device. The top part may couple the bottom via a connection, such as, for example, a snap fit. Thus, in such an example, the two parts of the cradle 106 may cover the entire computing device, and secure it in place. The top part of the cradle may have a translucent cover to enable access to a display of the computing device.

In some embodiments, the cradle 106 may be of a fixed size, but may be configured to house computing devices of different sizes. In such embodiments, the cradle may work in conjunction with a case covering the computing device 104 to affect a secure connection. The secure connection may comprise a hook and loop connection, a snap fit connection, an adhesive connection, a magnetic connection, or any other mechanical and/or electrical connection. For example, the cradle may comprise a magnet which is attracted to a magnetic case covering at least one side of the computing device 104. In another example, the computing device case may be affixed to the cradle with a magnetic grid or otherwise charged grid located on both the cradle and the case. In such examples, the magnetic grid may provide an indication of proper alignment of the device in the cradle. In yet other examples, the computing device case may comprise the female end of a clip, while the cradle comprises the male end of a clip, such that when the case and the cradle mate, the computing device is securely connected to the airframe.

In various embodiments, airframe 102 may further comprise attachment modules 116. In the illustrative example, an attachment module 116 is located proximate to the cradle, and houses the control management system. In other examples, the attachment modules 116 may be located on any portion of the airframe, such as the arms, the cradle, and/or a base.

The attachment modules 116 may be configured to secure additional equipment to the UAV 100. For example, the attachment modules 116 may be configured to house lights (e.g., navigation, spot lights, etc.), cameras (e.g., still, video, digital, forward-looking infra-red, range, electronically stabilized platforms, etc.), communication equipment (e.g., computers, antennae, etc.), action sensors (e.g., gesture sensors, motion sensors, etc.), facial recognition sensors, collision avoidance systems, distance sensors, ultrasonic sensors, accelerometers, gyroscopes, positioning sensors (e.g., global positioning system transmitters and/or receivers), or any other desired payload.

In some embodiments, the attachment module 116 may be configured to house camera lenses. In such embodiments, the camera lenses may be configured to operate in conjunction with a computing device camera in order to increase and/or decrease the view angle of the computing device camera. For example, a wide-angle camera lens may be situated directly adjacent to a portion of the computing device camera, thereby increasing the angle of the computing device camera lens. Additionally or alternatively, a narrow angle camera lens may be used to further focus the view of the computing device camera. Additionally or alternatively, a lens may be added that changes an aspect of the computing device camera, for example, the focal length may remain the same as the original computing device camera, where a filter feature, a tilt shift feature, or others may be provided by the lens. Additionally or alternatively, various embodiments contemplate multiple lenses, compound lenses, or combinations thereof. Additionally or alternatively, any of the foregoing configurations may also be combined with one or more other imaging devices. For example, the computing device camera may be used or it may not be used. For example, an additional imaging device may be used with any of the foregoing lenses or combinations thereof. Additionally or alternatively, imaging devices may collect thermal, infer red, visible, ultraviolet light, among others, or combinations thereof.

Additionally or alternatively, attachment modules 116 may be configured as gimbaled mounts for additional equipment. For example, attachment module 116 may comprise a gimbaled mount to which a camera may attach, for increasing the range of view of the camera. In various embodiments, the attachment modules 116 may further be configured to house a prism and/or mirror. In such embodiments the prism and/or mirror may be used to adjust the angle of view of one or more components of the computing device and or one or more additional components. For example, the camera angle of a computing device housed in the cradle may be straight down when the UAV is in a level, stable flight configuration. However, it may be desirable to see what is in front of the UAV. Thus, the mirror and/or prism may be adjusted into a position at least partially in front of the camera lens, and placed at an angle so the camera can view what is reflected off the mirror and/or prism. In such a configuration, the mirror and/or prism may effectively increase the view of the stationary camera to approximately 360 degrees.

In various embodiments, the attachment module 116 may comprise a connection such that the additional equipment may transmit and/or receive data from the control management system. For example, a collision avoidance system may be coupled to the attachment module. The collision avoidance system may comprise a radar, a portable collision avoidance system, a ground proximity warning system, a terrain awareness and warning system, a laser distance sensor, an ultrasonic sensor, or any other type of sensor capable of detecting potential obstacles along a flight path. The collision avoidance system may send one or more signals to the control management system, alerting the control management system of the threat. The control management system may process the signals, and adjust the flight path as necessary to avoid the obstacle.

In various embodiments, the additional equipment, as discussed above, may be coupled to the airframe directly. In such embodiments, for example, the collision avoidance system may be directly coupled to the airframe 102, and connected to the control management system via a wired and/or wireless connection.

Figure 2:
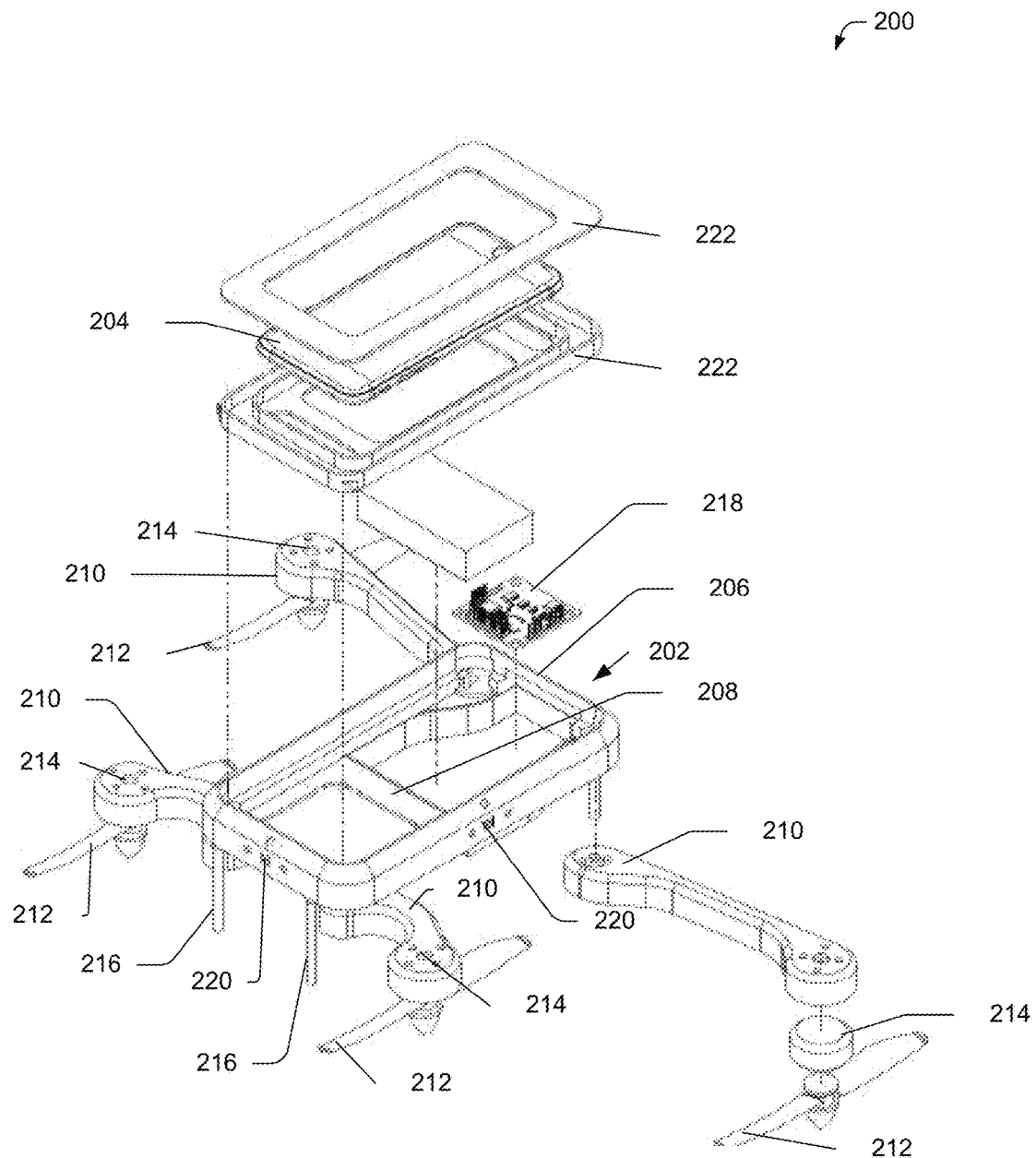
FIG. 2 is a component view of the UAV shown in FIG. 1.

FIG. 2 is a component view of the illustrative UAV shown in FIG. 1. As discussed above, UAV 200 may comprise an airframe 202 and a decoupleable computing device 204. The airframe 202 may comprise a cradle 206 to house the computing device 204. The airframe may also comprise a back plate 208, one or more arms 210, one or more rotors 212, one or more motors 214 coupled to the one or more rotors 212, and one or more landing surfaces 216.

In the illustrative example, the UAV 200 is a quad-copter with four arms 110, each configured to house a motor 114, the motor 114 being coupled to and configured to drive a rotor 112. In other examples, the one or more motors 114 may be mounted elsewhere on the airframe, and may transmit power to the rotors via a rotor shaft.

In various embodiments, UAV 200 may comprise a control management system 218 to control the power produced by the motors and/or the pitch and/or speed of the rotors. As shown in FIG. 2, the control management system 218 may be embedded in the airframe 202 of the UAV, and may comprise a motherboard with sensors and processors. In some embodiments, control management system 218 may be attached to the airframe 202 via an attachment module 220. In still yet other embodiments, part of the control management system 218 may be embedded in the airframe 202, while another part may attach to the airframe 202 via one or more attachment modules 220.

In various embodiments, the processors of the control management system 218 may be configured to interface with the computing device 204 and/or a remote computing device. The processors of the control management system 218 may also be configured to process input from sensors onboard UAV 200 and/or sensors embedded in computing device 204. In various embodiments, the processors of the control management system 218 may be configured to monitor voltage on one or more batteries on the airframe and/or on the computing device 204. In some embodiments, the control management system 218 may be configured to receive flight input directly from one or more memories stored in the UAV, from a remote computing device, or from computing device 204 housed in the cradle 206.

In various embodiments, the cradle 206 may be adjustable, thus making it capable of housing computing devices of different sizes and shapes. As shown in FIG. 2, the cradle may be configured to work in conjunction with a case 222 covering at least part of the computing device 204. In such embodiments, the case 222 may attach to the cradle via one or more snap fits, latches, hooks, fixed and/or adjustable clamps, magnets, or the like. In various embodiments, the case 222 may comprise one or more pieces to surround computing device 204. The case 222 may secure the computing device 204 in place, and may provide protection for the device.

Figure 3B:
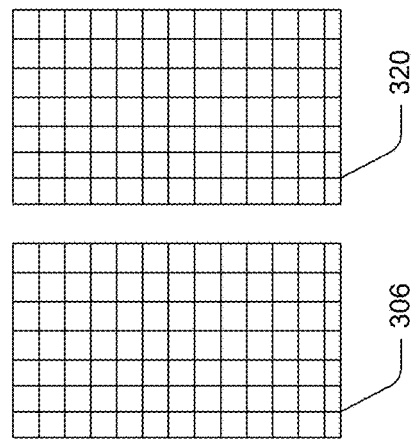
FIG. 3B depicts an exemplary cradle and computing device case alignment indicator.
Figure 3C:
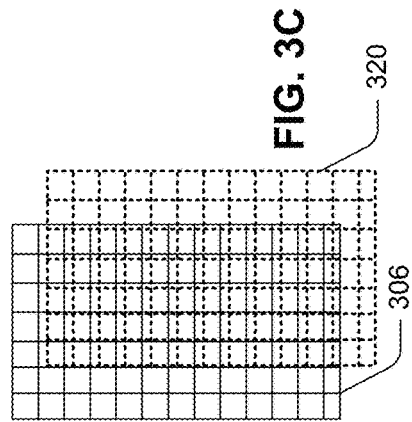
FIG. 3C depicts an exemplary cradle and computing device case illustratively aligned.
Figure 3A:
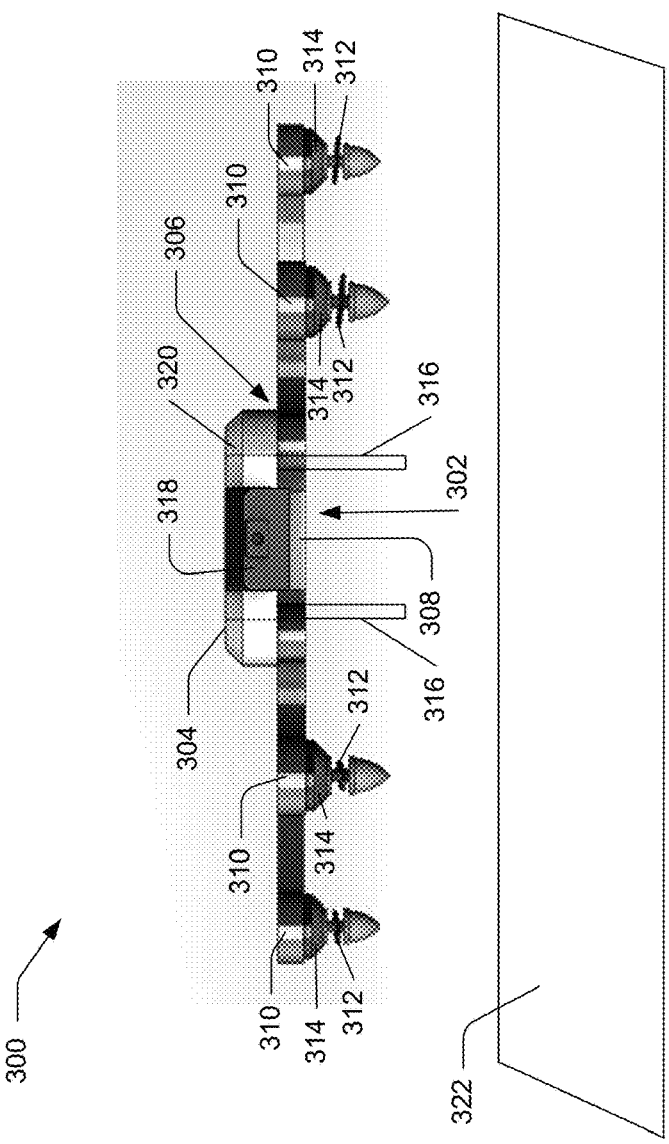
FIG. 3A is a side view of the UAV shown in FIG. 1.

FIG. 3 is a side view of the UAV shown in FIG. 1, with an exemplary cradle and computing device case line-up indicator. FIG. 3A is a side view of the UAV shown in FIG. 1. FIG. 3B depicts an exemplary cradle and computing device case line-up indicator.

The UAV illustrated in FIG. 3A, like UAV 100, comprises an airframe 302 and a decoupleable computing device 304, such as computing device 104. The airframe 302 may comprise a cradle 306, a back plate 308, one or more arms 310, one or more rotors 312, and one or more motors 314 coupled to the one or more rotors 312, and one or more landing gear 316. The landing gear 316 may comprise a metal material, a plastic material, a rubber material, a wood material, or a composite material. In some embodiments, the landing gear 316 may comprise ball bearings or other round surfaces which may allow the UAV 300 to roll on a landing surface.

In various embodiments, the airframe 302 may comprise a control management system 318. As depicted in FIG. 3, the control management system 318 is coupled to the UAV via an attachment module, such as attachment module 116. However, the control management system 318 may be coupled to the back plate 308 or another component of the airframe and/or embedded fully or partially within the airframe 302.

In the illustrative embodiment, cradle 306 comprises a fixed housing with a connector to secure the computing device 304. In such an embodiments, the cradle 306 may work in conjunction with a case 320, the case covering at least part of the computing device 104, to affect a secure connection between the cradle 306 and the computing device 304. The connectors may be magnetic, electrical, mechanical, or any other type of connector known to secure to objects together. For example, the cradle 304 may comprise one or more magnets which are attracted to one or more magnets in the case 320. For another example, the case 320 may be affixed to the cradle 306 by an electric attraction or otherwise charged grid located on both the cradle 306 and the case 320. For yet another example, the cradle 306 and the case 320 may each be configured with one half of a hook and loop connector. Still yet other examples are contemplated.

As illustrated in FIG. 3B, the case 320 and/or the cradle 306 may comprise an alignment indicator, to cause a predefined balance of the computing device 304 with respect to the UAV. In the illustrative example, the alignment indicator may comprise a grid system. In such embodiments, the cradle 306 and the case 320 may both comprise a grid. In some embodiments, the case may comprise one half of a grid, while the cradle may comprise the other half. Thus, when the grids are aligned, the computing device 304 may be secured for a desired balancing into the cradle 306. Additionally or alternatively, the grids may be offset from each other by a predetermined number of grid spaces to accommodate a desired balance. For example, case 320 may be offset from cradle 306 by one or more grid spaces either laterally, or horizontally, or both. Additionally or alternatively, various embodiments contemplate that the offset may be full grid spaces, partial grid spaces, or combinations thereof.

FIG. 3C shows an illustrative embodiment where case 320 is offset from cradle 306 by one or more grid spaces. Various embodiments contemplate that the offset may provide a desired balance for the UAV. Various embodiments contemplate that the offset may accommodate various types of computing devices 304. For example various types of computing devices 304 may have varying sizes and/or weight distributions. The offset of the one or more grid spaces may be calculated by the system, determined through an initial position with a test and suggested relocation, looked up on a database, or combinations thereof.

The cradle 306 may be configured to house multiple different computing devices 304. As such, the control management system 318, such as control management system 116, may be configured to balance the UAV 300 with each different computing device 304 (e.g., ensure the center of gravity for the UAV is sufficient for stable flight). The control management system 318 may balance the UAV 300 manually and/or automatically based on the computing device dimensions, such as the length, width, height, and weight of the computing device 304. The UAV 300 may be balanced by adjusting the position of the cradle 306 and/or the position of the one or more arms 310. One skilled in the art understands that an aircraft balance comprises a forward and aft balance as well as a left and right balance.

The one or more arms may be adjusted from a retracted position at 0 degrees along a plane. In some embodiments, the arms may retract to a position between 0 degrees and −45 degrees. In some embodiments, the arms may be adjustable 360 degrees along the plane. In some embodiments, the arms may be adjustable from 0 degrees to a maximum range of 270 degrees. Each arm may be positioned individually based on the size, shape, and weight distribution of the computing device 304.

In some embodiments, the one or more arms may be manually adjusted throughout their respective ranges based on the size of the computing device 304. The computing device 304 may comprise a computing device any size or shape, such as, for example, a 3"×4" smartphone, a 3"×6" smartphone, a 5"×8" tablet, etc. Additionally or alternatively, the computing device 304 may be configured to house computing devices of a certain width range and/or height range (e.g., width between 2"-6", or 3"-10", etc., and a length between 4"-8", or 5"-15", etc.). It is understood that the length and the width of the computing device may be interchangeable. Thus, the device may be rotated 90 degrees between a portrait mode and a landscape mode.

In such embodiments, the airframe may have indicators for positioning for particular devices. For example, each arm may have indicators for a first position corresponding to an iPhone 6, and a second position corresponding to an iPad Air 2. For another example, each arm may have indicators for a first position corresponding to a Windows Phone, and a second position corresponding to a Lenovo Miix 3 tablet.

In various embodiments, the computing device 304 may store, such as, for example, in an application, a preferred and/or recommended position for the one or more arms based upon the dimensions and weight distribution for the computing device 304. In some embodiments, the computing device 304 or a remote computing device may be able to access, from a network-based source, a preferred and/or recommended position for the one or more arms based upon the dimensions and weight distribution of the computing device 304. For example, a flight management system stored on the computing device 304 may contain desired settings for the arms of the UAV, and may communicate the desired settings to the control management system 318. For another example, the control management system may query a network-based resource, such as a cell phone manufacture for the dimensions and weight distribution of computing device 304.

In various embodiments, an application on computing device 304 may send the computing device 304 dimensions to the control management system 318 upon establishing a connection with the control management system 318. The connection may be wired and/or wireless (e.g., local area networks (LANs), wide area networks (WANs), personal area networks (PANs), body area networks (BANs), near field communication (NFC), satellite networks, cable networks, Wi-Fi networks, WiMax networks, mobile communications networks (e.g., 3G, 4G, and so forth), or any combination thereof). In some embodiments, the computing device 304 may send the dimensions to the control management system 318 once secured in the cradle 306.

In various embodiments, responsive to receiving computing device 304 dimensions, the control management system may adjust the arms and/or cradle to balance the UAV 300 via one or more electrical actuators. In some embodiments, the landing gear 316, may comprise sensors configured to measure the weight and/or torque applied at a point touching a landing surface. In such embodiments, the control management system 318 may receive the landing gear sensor input, and use that to calculate the position for the arms and/or cradle.

In various embodiments, the arms and/or cradle may be adjusted manually. In some embodiments, the arms and/or cradle may comprise pre-set positions for devices of a particular dimension and weight. In some embodiments, the control management system 318 may calculate the position for the arms and/or cradle, and may display the position information on a display of the computing device 304 and/or a remote computing device. For example, the control management system may inform a user, through the display, that the cradle should be moved two clicks to the left and one click up. In another example, in an embodiment with a grid system cradle and case line-up, the control management system may inform the user that the cradle should be moved to a particular grid position for proper balancing. In another example, the control management system 318 may inform the user, through the display, that the fore-arms should be moved to a first position with respect to the airframe, while the aft-arms should be moved to a second position with respect to the airframe. In yet another example, the presentation on the display on the computing device may comprise arrows, showing the user where to place each of the arms.

In various embodiments, the control management system 318 may connect to a landing plate 322 via a wired and/or wireless connection. The landing plate may aid the control management system 318 in calculating the balance of the UAV 300 based at least in part upon a weight distribution at each of landing surfaces 322. Responsive to receiving the weight distribution information, the control management system 318 may adjust the arms 310 and/or cradle 306 to balance the UAV 300. In various embodiments, the control management system 318 may cause the UAV 300 to lift into a hover during initial takeoff, and may verify a proper balance.

Additionally or alternatively, the control management system 318 may adjust, or inform a user to manually adjust, the arms 310 to an initial setting. Once the initial setting is determined, the UAV 300 may lift into a hover and verify the proper balance. In some embodiments, the proper balance may be based upon a current draw on each of the electrical motors powering the rotors. If the initial setting does not result in a proper balance, the control management system may calculate the efficiency of the initial setting of the arms 310. In some embodiments, the control management system 318 may calculate any adjustments needed to the arms 310 and/or cradle 306, to properly balance the UAV 300. In such embodiments, the measurements may be calculated by determining the electrical current required for each motor to maintain stable flight, and comparing the currents. In various embodiments, the control management system 318 may then automatically make the adjustments, such that the electrical current required for each of the motors is substantially equal. For example, one or more motors may be relocated accordingly. In some embodiments, the control management system 318 may display the manual adjustments to the arms and/or cradle necessary to maintain balanced flight.

In some embodiments, the control management system 318 may provide an option to continue at a reduced efficiency, with the UAV 300 slightly out of balance. In such embodiments, the control management system 318 may calculate reduced performance characteristics (e.g., increased power required, decreased airspeed, decreased range, etc.) as a result of the out of balance condition. Additionally or alternatively the control management system 318 may provide the performance characteristics of the UAV 300 with the arms and/or cradle moved to the balanced position, thereby a providing an ability to compare out of flight performance characteristics with an in balance flight performance characteristics. The control management system 318 may cause the performance characteristics to be displayed on a display on the computing device 304 and/or a separate display on the UAV 300. For example, the control management system 318 may cause the display of a note to a user, such as, for example, "in this position, the UAV will be capable of a maximum airspeed of 10 knots and a maximum flight time of 20 minutes. In the adjusted position (e.g., cradle position 2 clicks left, 1 click up, fore-arms at position 2, aft-arms at position 4, etc.), the UAV will be capable of a maximum airspeed of 15 knots and a maximum flight time of 30 minutes.

In some embodiments, the landing plate 322 may be configured to communicate with UAV 300 via the control management system 318 and/or computing device 304 to provide the UAV 300 with a base location. The base location may be the location in which the UAV should return to for landing. In some embodiments, the base location may be set as a particular waypoint or the location of take-off. In various embodiments, the control management system 318 or other power management component on UAV 300 may continually track a battery life remaining for the UAV 300 and/or computing device 304. Based upon the distance to the base location, the control management system may calculate a return-to-base time. At the return-to-base time, the control management system and/or the application on computing device 304 may calculate a route and cause UAV 300 to return to the base location. With the return-to-base function enabled, the UAV 300 may constantly track the batteries on board to ensure the UAV 300 will not deplete the battery stores to a point in which it is no longer able to fly.

In various embodiments, the landing plate 322 may charge the batteries onboard the UAV 300 via connectors. In such embodiments, the UAV 300 may land on the landing plate 322, and the one or more landing gear 316 may physically connect to one or more connectors (e.g., plug-in connector, inductive coupler, etc.). The one or more connectors may then transfer electrical power to the batteries onboard the UAV 300. In some embodiments, the computing device may be coupled to the UAV 300 such that it may receive electrical power from the UAV 300, such as, for example, via a USB or similar connection.

Figure 4:
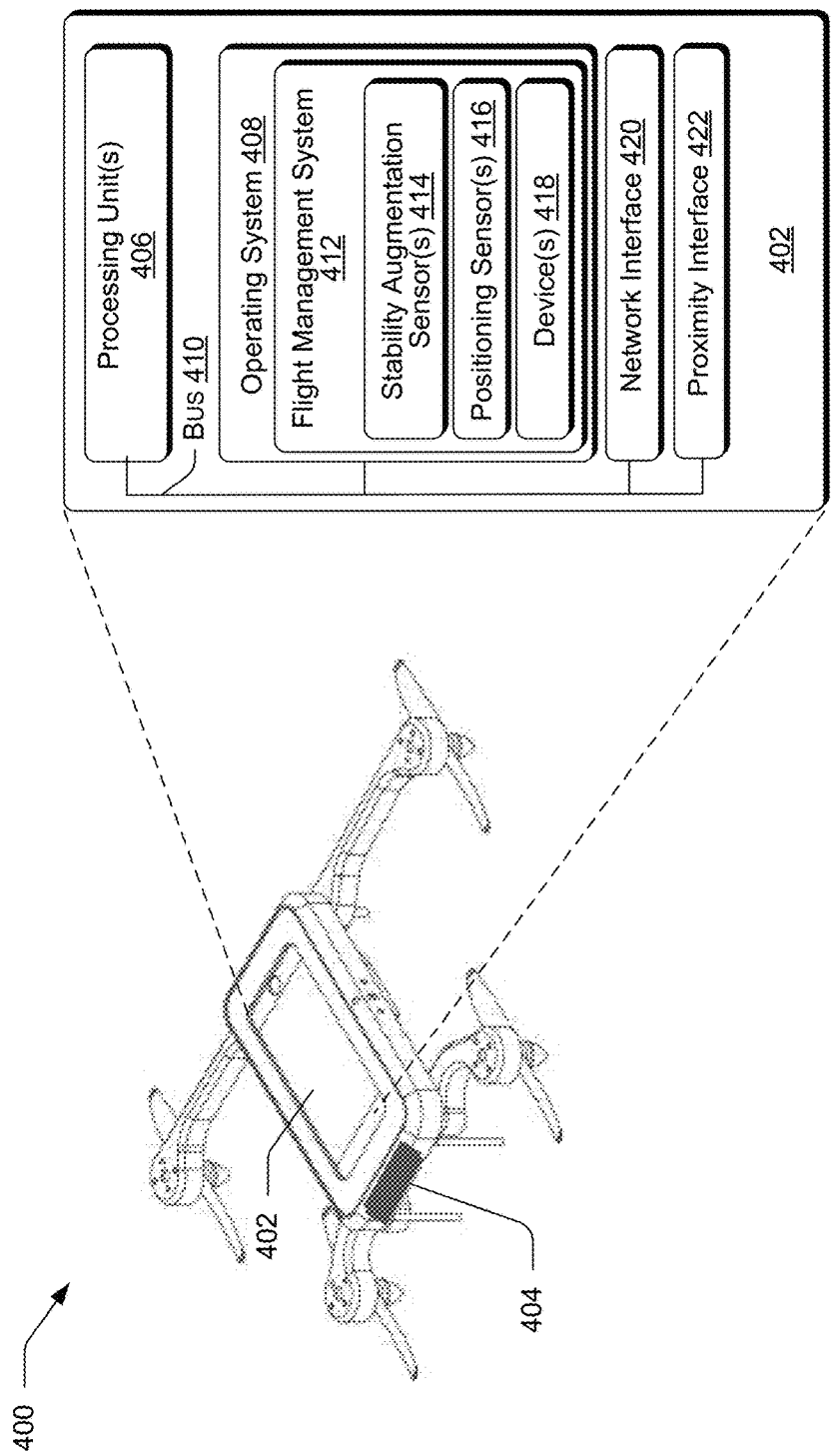
FIG. 4 is a perspective view of the UAV shown in FIG. 1 with an expanded view of the internal components of the computing device.

FIG. 4 is a perspective view of the UAV shown in FIG. 1 with an expanded view of the internal components of the computing device.

As discussed above, computing device 402 may provide the UAV with flight management input (e.g., direction, velocity, altitude, waypoints, a flight plan, geolocation, etc.)

and/or orientation/balance input (e.g., input from one or more accelerometers, gyroscopes, magnetometers, etc.). Computing device 402 may connect to a control management system 404, such as control management system 218 via a wired and/or wireless connection. Once connected, computing device 402 may transmit flight management and orientation data to the control management system 404. In some embodiments, the computing device 402 may also be configured to receive flight management and orientation data from the control management system 404.

In various embodiments, the computing device 402 may include any computing device having one or more processing unit(s) 406 operably connected to operating system 408 such as via a bus 410, which in some instances can include one or more of a system bus, a data bus, an address bus, a PCI bus, a Mini-PCI bus, and any variety of local, peripheral, and/or independent buses, for example universal serial buses (USB). The operating system 408 can be any operating system capable of managing computer hardware and software resources. For example, operating system 408 may manage a flight management system 412, one or more stability augmentation sensors 414 (e.g., accelerometers, gyroscopes, magnetometers, and the like), positioning sensors 416 (e.g., global positioning system sensors, and the like), and various other devices 418 (e.g., still camera, video camera, 3D camera, ultrasonic sensor, etc.).

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

In some embodiments, one or more stability augmentation sensors 414 monitor a position, angle, acceleration, and/or orientation of a portion of the computing device 402. For example, the stability augmentation sensors 414 may comprise gyroscopes and/or accelerometers that monitor the pitch, roll, and yaw of the computing device 402, and changes of each over time. The stability augmentation sensors 414 may provide the aforementioned positioning data via signals to a control management system 404.

For example, the stability augmentation sensors 414 may detect a sudden tilt of the aircraft due to a gust of wind or other force exerted on the UAV 400. In response, the stability augmentation sensors 414 may transmit a signal, via flight management system 412, to the control management system 404. The control management system 404 may cause an increase or decrease in thrust generated by one or more rotors to cancel the exerted force, and thus stabilize flight of the UAV 400.

The control management system 404 may comprise a computer system with one or more processors, one or more memories, an operating system, control logic, and/or one or more parameters. The control management system 404 may process the signals from the computing device 402 to determine how to direct and power the rotors to maintain the desired flight regime.

The desired flight regime may be determined by flight management system 412. The flight management system 412 may comprise an application or program loaded on a computing device, configured to receive input from stability augmentation sensors 414, positioning sensors 416, and various other devices 418. In some embodiments, the flight management system 412 may process the inputs, and send the information to the control management system to adjust the arms and/or rotors as necessary to maintain balanced flight.

In various embodiments, the computing device 402 may also comprise a network interface 420 to enable communications between computing device 402, UAV 400, and/or one or more remote devices via a network. For example, a network may include public networks such as the Internet, private networks, such as an institutional and/or personal intranet, or some combination of private and public networks. A network may also include any type of wired and/or wireless network, including but not limited to local area networks (LANs), wide area networks (WANs), personal area networks (PANs), body area networks (BANs), near field communication (NFC), satellite networks, cable networks, Wi-Fi networks, WiMax networks, mobile communications networks (e.g., 3G, 4G, and so forth), or any combination thereof.

Networks may utilize communications protocols, including packet-based and/or datagram-based protocols such as internet protocol (IP), transmission control protocol (TCP), user datagram protocol (UDP), or other types of protocols. Moreover, networks may also include a number of devices that facilitate network communications and/or form a hardware basis for the networks, such as switches, routers, gateways, access points, firewalls, base stations, repeaters, backbone devices, and the like.

Network interface 420 may include one or more network interface controllers (NICs) or other types of transceiver devices to send and receive communications and/or data over a network. Additionally or alternatively, computing device 402 may also comprise proximity interface 422 to further enable communications between computing device 402, the UAV, and/or one or more remote devices. Proximity interface 422 may include one or more proximity network interface controllers or other types of transceiver devices to send and receive communications over a proximity network. As used herein, a proximity network may be peer-to-peer, wireless USB, Bluetooth, IrDA, Z-Wave, body area, or any other wired or wireless path based on the proximity of at least two devices. In some embodiments, control management system 404 may comprise a network and/or a proximity interface to enable communication and/or data transfer with computing device 402.

In various embodiments, the flight management system 412 may provide a flight plan to the control management system 404. The flight plan may comprise a particular waypoint, a series of waypoints, a random set of waypoints, a follow-me feature, or any other route of flight information. The flight plan may include an airspeed or series of airspeeds for the drone to fly throughout the flight plan. Additionally, the flight plan may comprise an altitude, a range of altitudes, or a series of altitude adjustments for the drone to make throughout the flight plan. In various embodiments, the flight management system 412 may send input to the control management system 404 to effect a change in the direction, velocity, or altitude of the drone, as necessary to maintain the flight plan.

In various embodiments, the flight plan may be input into the flight management system 412 by entering one or more waypoints prior to flight. Each of the waypoints may correspond to a latitude and longitude, a street address, or a position on a grid. The flight plan may be manually generated by inputting position information for one or more waypoints. The flight plan may also be input by downloading a pre-set series of waypoints from a server.

Additionally or alternatively, the flight plan may generated during flight. For example, computing device 402 may be set to a follow-me mode. The follow-me mode may be configured to maintain a particular distance, a range of distances, altitude, or range of altitudes from a second computing device. Thus, when the second computing device moves, UAV 400, based on input from computing device 402, will follow the second computing device, generating a flight plan on the fly.

For another example, computing device 402 on the UAV may be in communication with a second computing device via a wireless network. Computing device 402 may stream data from one or more sensors to the second computing device, such as a video. A user monitoring the dreaming data on the second computing device may want to take another look at a particular item viewed in the video. Thus, the user may input a command into the second computing device, which may then be transmitted to the computing device 402, to reverse the flight plan and stop at the item of interest. The second computing device may also transmit commands to create a new waypoint at the item of interest, loiter around the item of interest, hover close to the item of interest, etc.

In various embodiments, the flight management system 412 may store no-fly zone input, such as a restricted airspace. For example, a user may want to restrict drone flight over a body of water. The user may map the body of water as a no-fly zone, and consequently the flight management system will fly around the body of water. For another example, the flight management system 412 may be configured to receive, from the Federal Aviation Administration or other pertinent authority, a list or map of areas in which flight is prohibited. The flight management system 412 may process that information, and verify that a programmed flight plan does not violate the no-fly zone. In some embodiments, the flight management system 412 may provide a warning to the user if one or more flight plans will breach the boundary of a no-fly zone.

Additionally, the UAV 400 may be capable of fully autonomous flight in an emergency situation. For example, if the computing device becomes inoperable, the UAV 400 may be configured for an automatic recovery function in which the UAV may establish a hover and land without input from the computing device 402. For another example, the UAV 400 may enable an automatic recovery function, such as through the control management system, upon lost contact with the computing device 402 or a second computing device.

FIG. 5 depicts multiple versions of the cradle with adjustable clamps configured to secure a computing device to a UAV, such as UAV 100. Each of the adjustable clamps 502 may be adjusted manually and/or automatically to accept a computing device, such as computing device 104. In various embodiments, the fixed and/or adjustable clamps may comprise pressure sensors providing a user making the manual adjustment and/or the control management system with pressure information. The pressure information may comprise a notification of sufficient pressure to ensure the computing device is secure. In some embodiments, the pressure information may also comprise a notification of maximum pressure applied to the device, warning the user that any further applied pressure may result in damage to the decoupleable computing device. The indication may be in the form of a light. In such examples, the light may turn green when sufficient pressure is applied to hold the computing device in place. If maximum pressure is applied, the indicator light may turn red, thereby warning the user to not apply any more pressure to the computing device.

Figure 5A:
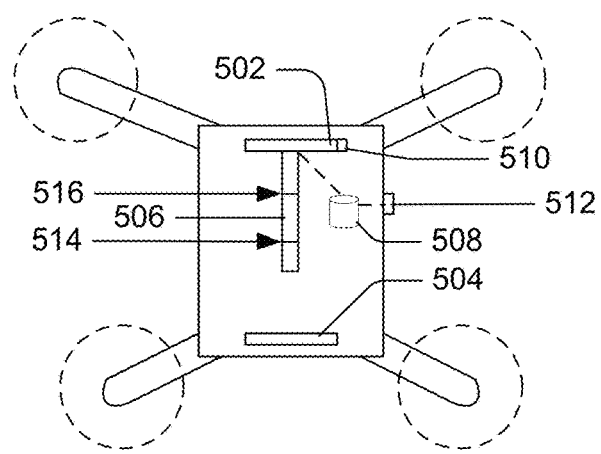
FIG. 5A depicts a cradle with one adjustable clamp and one fixed clamp.

In the illustrative embodiment shown in FIG. 5A, a cradle, such as cradle 106 may comprise one adjustable clamp 502 and one fixed clamp 504. The adjustable clamp 502 and the fixed clamp 504 may comprise a metal material, a plastic material, a wood material, or another stiff material. In some embodiments, the adjustable clamp 502 may be adjustable along a track 506 in the cradle. In some embodiments, the adjustable clamp 502 may comprise a telescopic arm, thereby allowing the clamp to extend and retract, along the track 506, as necessary to house a computing device.

The adjustable clamp 502 may be adjusted automatically for a computing device, based on the dimensions of the computing device. In some embodiments, the computing device may transmit computing device dimensions to a control management system. For example, when an application, such as flight management system 412, is launched on the computing device within a proximity of the UAV, the application may automatically send computing device data to the control management system. Responsive to receiving the dimensions, the control management system may signal the activation of an actuator 508 to cause the adjustable clamp 502 to extend or retract to the proper position for the computing device. The actuator 508 may be electric, mechanical, hydraulic, or any other type of actuator. In such embodiments, a pressure sensor in the adjustable clamp and/or the fixed clamp may transmit a pressure signal to the control management system. In various embodiments, the control management system may be configured to deactivate the actuator 508 when the pressure reaches a certain amount. In some embodiments, the pressure sensor may directly cut off the signal from the actuator 508 to the adjustable clamp 502 upon reaching a certain pressure.

In various embodiments, the adjustable clamp 502 may be adjusted manually. In such embodiments, the adjustable clamp 502 may be manually manipulated along a track 506, and secured into place with a fastening mechanism 510. The fastening mechanism may include, but is not limited to a screw, a bolt, a nut, a pin, a rubber band, and/or any other mechanism configured to secure a device. The adjustable clamp 502 may also be telescopic, and secured at a particular length with the fastening mechanism 510. The fastening mechanism 510 may include, but is not limited to a screw, a bolt, a nut, a pin, a rubber band, and/or any other mechanism configured to secure a device. In some embodiments, the adjustable clamp and the fixed clamp may be connected to each other via a tension mechanism such as a rubber band, a spring, or another tension mechanism affixed to the clamps.

In various embodiments, the adjustable clamp 502 may be adjusted by manual activation of actuator 508 via button 512. In such embodiments, a user may manually press button 512, sending a signal to activate the actuator and cause the adjustable clamp to move. The button 512 may have an extend feature and a retract feature. In some embodiments, the button 512 may comprise a bifurcated button, such that pressing one half of the button causes the adjustable clamp 502 to extend, while the other half causes it to retract. In some embodiments, the button 512 may comprise a toggle switch, such that toggling in one direction causes the adjustable clamp 502 to extend, and toggling in the opposite direction causes the adjustable clamp 502 to retract.

In various embodiments, the adjustable clamp may comprise one or more pre-determined settings, such as settings 514 and 516, for computing devices of particular sizes. The length settings may be determined by detents, clips, markings, or any other reasonable way to show a length setting. For example, setting 514 may be an adjustable clamp 502 setting for a 5-inch smartphone, while setting 516 may be an adjustable clamp 502 setting for an 8-inch tablet.

Figure 5B:
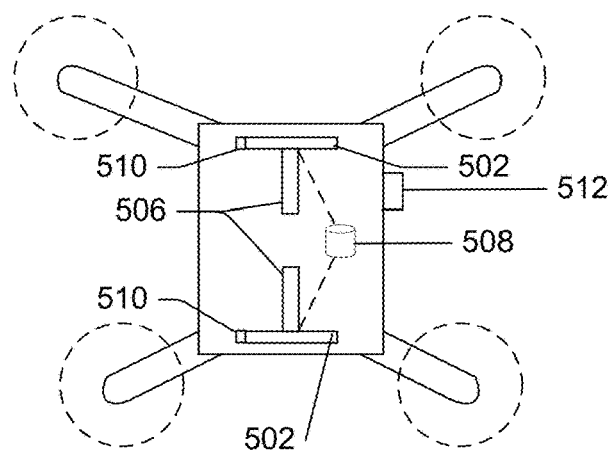
FIG. 5B depicts a cradle with two adjustable clamps.

As illustrated in FIG. 5B, the cradle may comprise two adjustable clamps 502 to secure the computing device. As described above, the adjustable clamps 502 may be adjusted manually and/or automatically.

In some embodiments, the computing device may transmit computing device dimensions to a control management system. In some embodiments, the dimensions of the computing device maybe input into the control management system directly and/or through a second computing device connected to the control management system via a wired and/or a wireless connection. In such cases, the second computing device may comprise a personal computing device, such as a smartphone, a tablet computer, a laptop computer, a desktop computer, a smart television, a two-in-one device, a three-in-one device, a personal digital assistant, or other similar device.

Responsive to receiving the dimensions, the control management system may signal the activation of an actuator 508 to cause the adjustable clamps 502 to adjust to the proper position for the computing device. The control management system may cause the adjustment of one or both adjustable clamps 502, based on the weight and balance of the UAV. In some embodiments, the adjustable clamps 502 may first secure the computing device in place. Once secured, the control management system may receive weight and balance input from various sensors, and may send signals to the actuator to move both adjustable clamps 502 to assist in balancing the UAV.

In various embodiments, the adjustable clamps 502 may be manually adjusted. In such embodiments, the adjustable clamps 502 may be manually manipulated along a track 506, which may be the track of a telescopic arm, and secured into place with a fastening mechanism 510. In some embodiments, the adjustable clamps 502 may be connected to each other via a tension mechanism such as a rubber band, a spring, or another tension mechanism affixed to the clamps.

In various embodiments, the adjustable clamps 502 may be adjusted by manual activation of actuator 508 via button 512. Button 512 may comprise a switch, one or more buttons, or any other method of engagement. In such embodiments, a user may manually press button 512, sending a signal to activate the actuator and cause the adjustable clamps to move. The button 512 may have an extend feature and a retract feature. For example, the button 512 may be toggled, such that toggling in one direction causes the adjustable clamp 502 to extend, and toggling in the opposite direction causes the adjustable clamp 502 to retract.

In some embodiments, each of the adjustable clamps 502 may be adjusted individually by a dedicated button 512. In other embodiments, the adjustable clamps 502 may be adjusted to get closer or farther away from each other at the same rate upon activation of button 512.

Figure 5C:
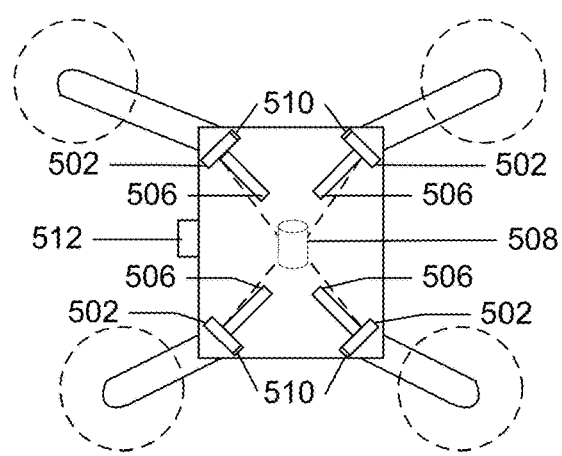
FIG. 5C depicts a cradle with four adjustable clamps.

As illustrated in FIG. 5C, the cradle may comprise four adjustable clamps 502. The adjustable clamps 502 depicted in FIG. 5C may operate as any of the adjustable clamps 502 described in FIGS. 5A and 5B.

The adjustable clamps 502 may be configured such that each pair of adjustable clamps are located opposite of one another. In the illustrative example, the adjustable clamps 502 are mounted such that each adjustable clamp 502 would secure a corner of a computing device. In some embodiments, each adjustable clamp 502 may secure a top side, a bottom side, a left side and a right side of the computing device.

Figure 6A:
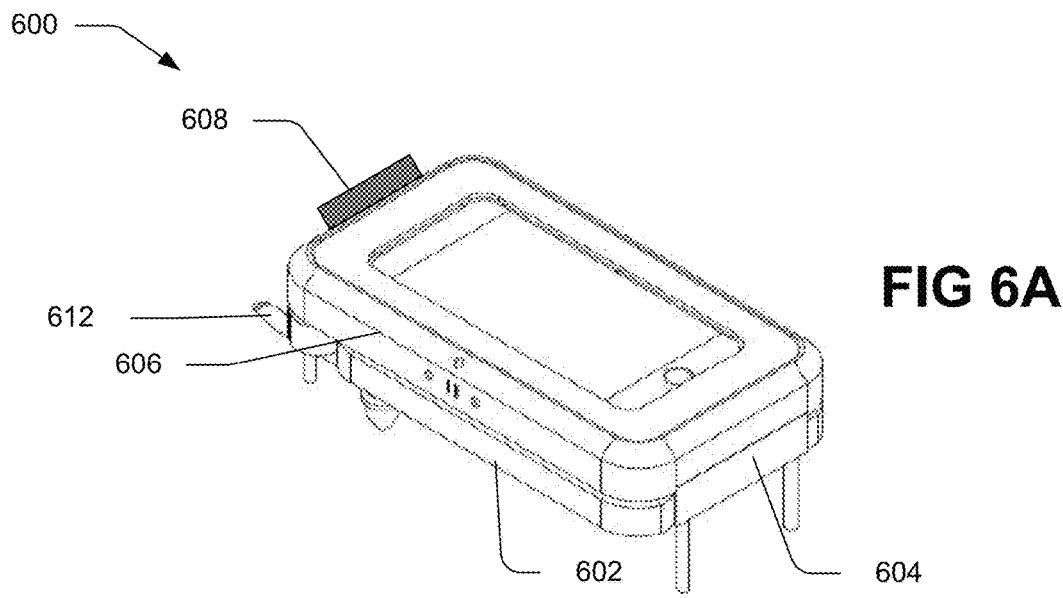
FIGS. 6A and 6B are perspective and rear views, respectively, of the UAV with the arms retracted.
Figure 6B:
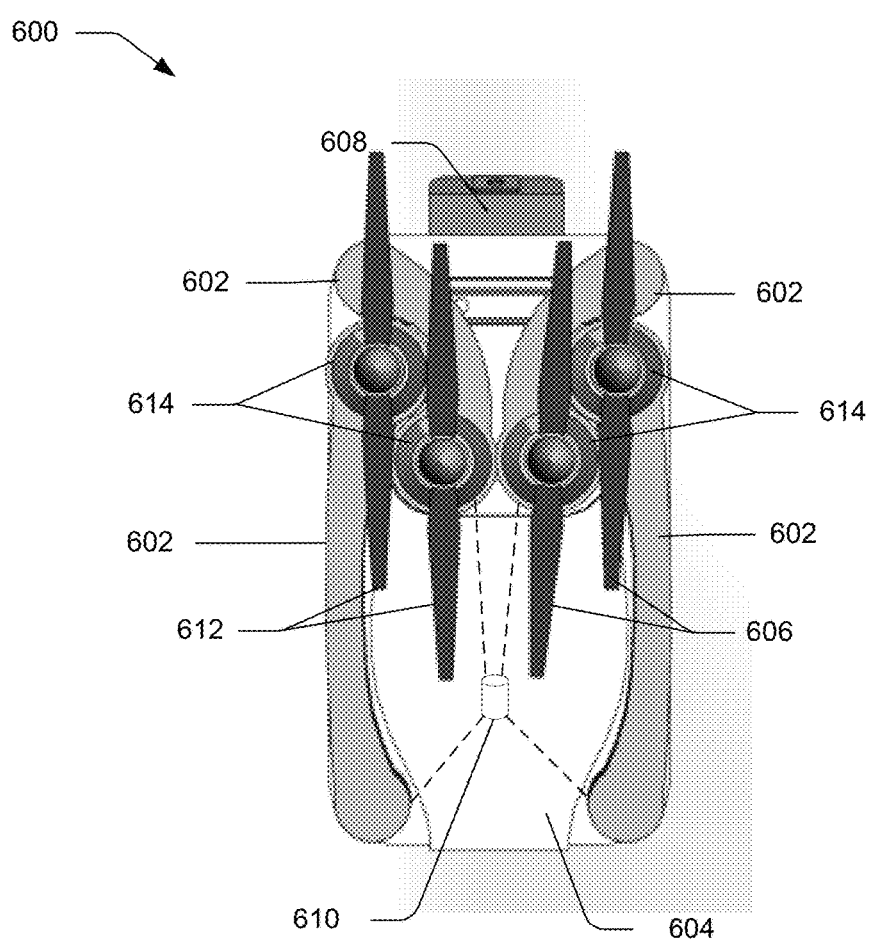

FIG. 6 depicts the UAV with the arms of the airframe retracted. FIGS. 6A and 6B are perspective and rear views, respectively, of the UAV with the arms retracted.

As discussed above, the arms 602 of the UAV, such as arms 110, may be adjustable along a plane from a retracted position as depicted in FIG. 6 to an extended position for flight. In the retracted position, arms 602 may tuck behind a back plate 604 of the airframe, the back plate 604 located between a cradle and/or case 606 and the arms 602.

In various embodiments, the UAV 600 may comprise a locking mechanism to hold the arms 602 in place in the retracted position. The locking mechanism may comprise one or more of a gear lock, a retractable guard, a detent, or similar locking device. The locking mechanism may be controlled manually by a user and/or by the control management system 608. In some embodiments, the control management system 608 may lock and unlock the arms 602 via a mechanism powered by the actuator 610.

In some embodiments, UAV 600 may comprise a locking mechanism to hold the rotors 612 in place while in the retracted position shown in FIGS. 6A and 6B. The locking mechanism for the rotors 612 may comprise a gear lock, a retractable guard, or similar locking device. In various embodiments, the motors 614, when disengaged, may lock the rotors 612 into position for storage (e.g., into the retracted position shown in FIGS. 6A and 6B).

As discussed above, the arms 602 may be extended for flight. The arms 602 may be manually and/or automatically deployed into an extended position for flight. In embodiments with automatic actuation, the actuator 610 may power the arms to deploy to the extended position for flight. In such embodiments, the control management system 608 may direct the actuator to send a signal to each arm to extend to a particular position, based on the computing device coupled to the cradle. For example, from a retracted position at zero (0) degrees relative to a lengthwise axis of the UAV 600, the arms may extend to a lesser angle (e.g., 70-100 degrees) for a computing device of smaller length, such as a smart phone. Whereas, the arms 602 may be extended to a greater angle (e.g., 100-150 degrees) for a larger computing device, such as a tablet. The examples presented herein are merely for explanatory purposes, and are not meant to limit the movement of the arms of the UAV for particular devices.

Figure 7:
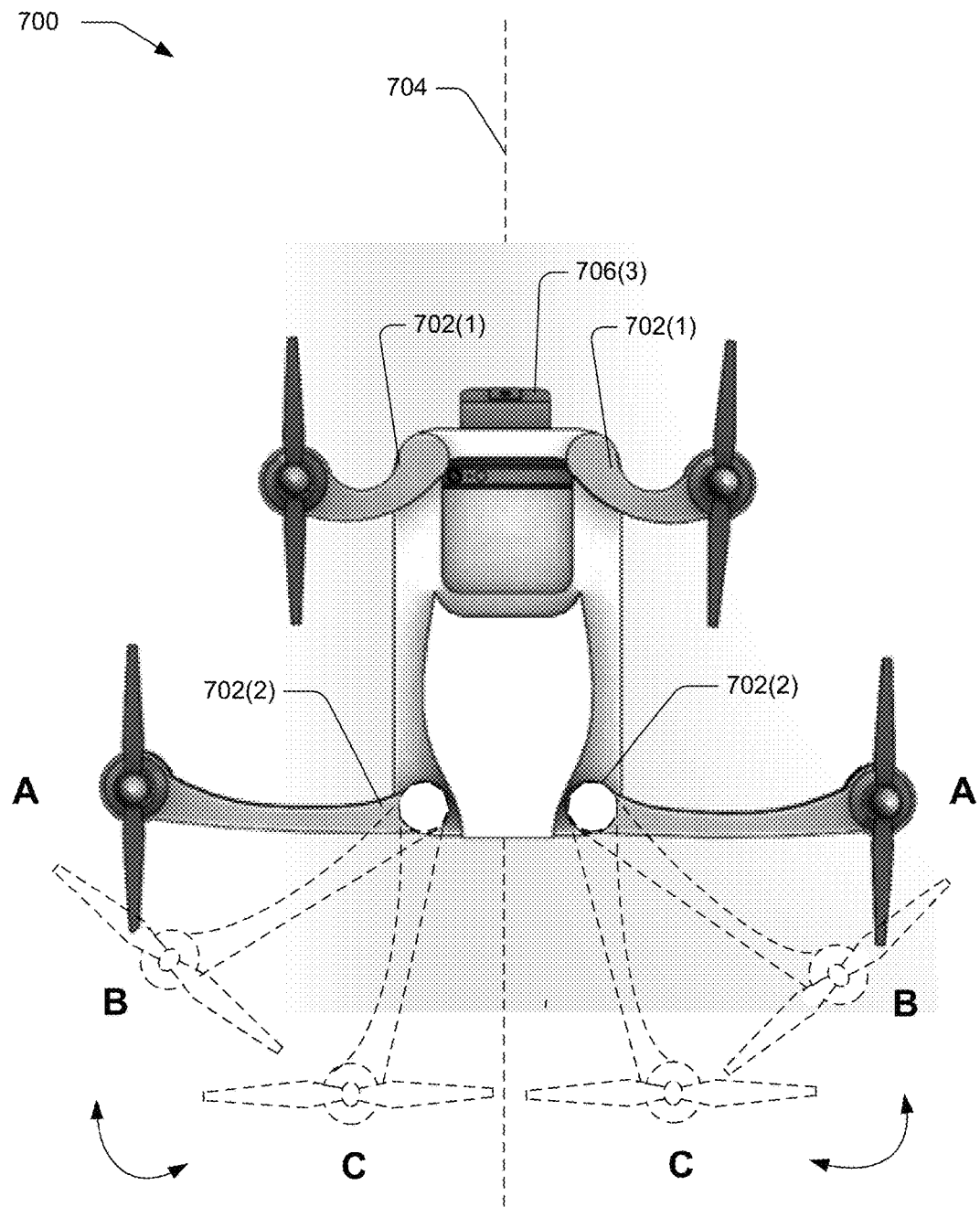
FIG. 7 is a rear view of the UAV shown in FIG. 5, with arms extended, depicting various positions of the arms.

FIG. 7 is a rear view of the UAV shown in FIG. 6, with arms extended. The arms 702 of UAV 700 may be extendable to a plurality of positions, based upon the weight and balance of the UAV 700. Weight and balance may be effected by the computing device and/or other external sensors, equipment, and the like, which may be attached to UAV 700 via attachment modules.

In the illustrative example, the arms 702 may be positioned at a substantially equivalent angle from a centerline axis 704 in each position. As shown at position A, aft arms 702(2) are configured at approximately 90 degrees from the centerline axis. At position B, aft arms 702(2) are configured at approximately 120 degrees from the centerline axis. At position C, aft arms 702(2) are configured at approximately 150 degrees from the centerline axis. However, the arms may be configured to angles greater and less than shown in the illustrative example.

FIG. 7 depicts aft arms 702(2) in various positions, while fore arms 702(1) remain at a position approximately 90 degrees from the centerline axis 704. However, fore arms 702(1) may be adjusted to different angles, similar to those shown with the aft arms 702(2) at positions B and C.

As depicted at position A, the fore arms 702(1) and the aft arms 702(2) may be configured at substantially the same angle relative to one another. In positions B and C, the fore arms 702(1) and the aft arms 702(2) may be configured at different angles relative to one another. In some embodiments, each of fore arms 702(1) and each of aft arms 702(2) may move independently of one another, and may be configured at different angles. For example, one aft arm 702(2) may be at position B, while the other aft arm 702(2) may be at position C, where positions B and C are at different angles with respect to the centerline axis 704.

Figure 8:
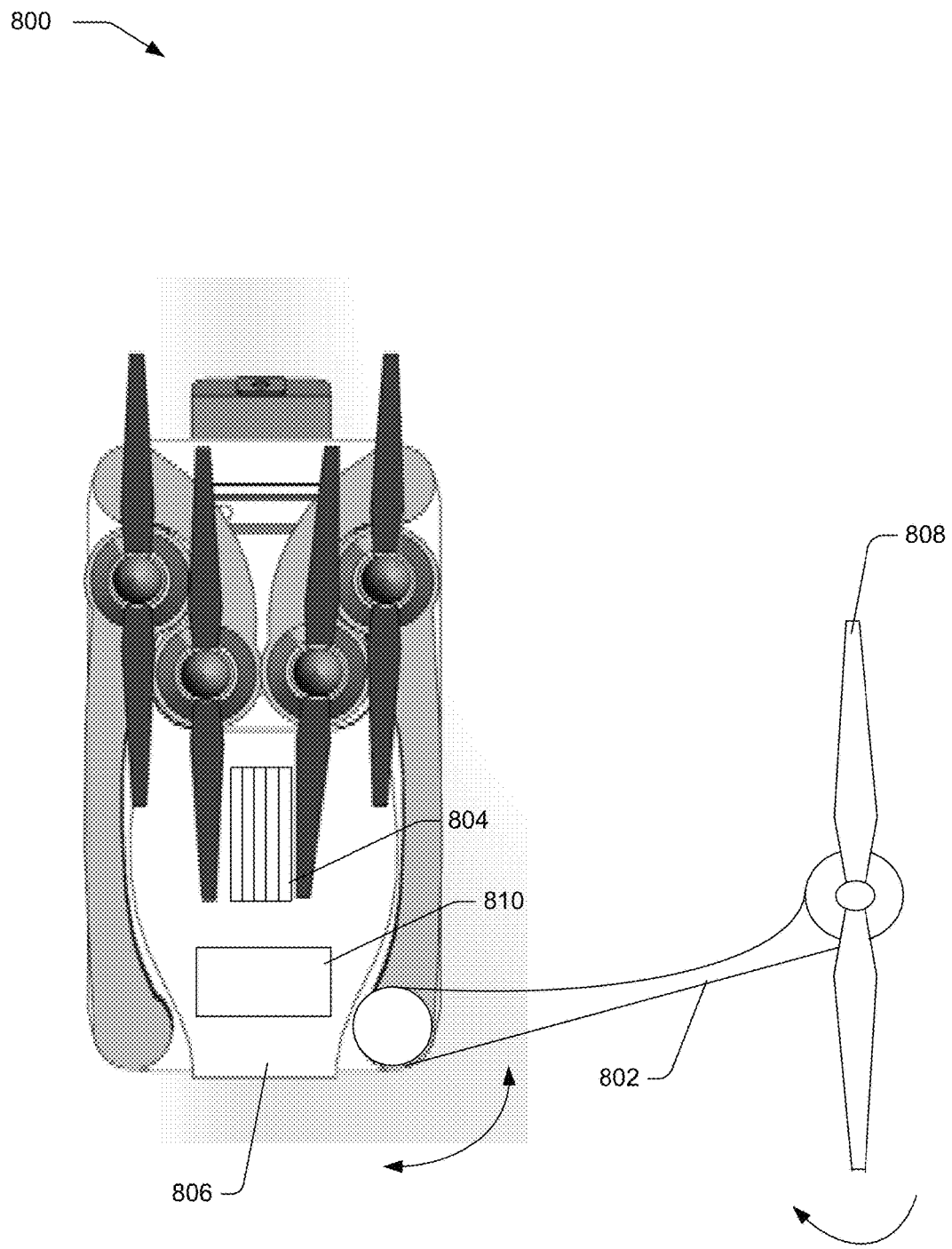
FIG. 8 is a rear view of the UAV with one arm of the airframe extended for the purposes of charging one or more batteries.

FIG. 8 is a rear view of the UAV with one arm 802 of the airframe extended for recharging one or more batteries 804. In various embodiments, the electricity to power the motors, actuator(s), control management system, and/or any other components coupled to the airframe may be provided by one or more batteries 804.

In some embodiments, the one or more batteries 804 may be stored inside the back plate 806, such as back plate 108, and/or one or more arms 802. In some embodiments, the one or more batteries 804 may be mounted on the back plate 806 and/or mounted on one or more arms 802. The batteries 804 may comprise nickel-cadmium, lead-acid, zinc-bromine, lithium-ion, nickel hydrogen, or any other type of rechargeable and/or disposable battery.

As depicted in FIG. 8, one or more arms 802 may be configured to extend individually while other arms are retracted. In such embodiments, the rotor 808 coupled to the extended arm 802 may spin in the ram air to generate electricity. For example, a user walking around with the UAV in hand may extend an arm of the UAV and recharge the battery by spinning the rotor in the wind.

In various embodiments, UAV 800 may comprise solar panels 810 to provide electricity to power the motors. In such embodiments, the solar panels may be incorporated into the skin (e.g., glued or painted on, manufactured with the skin) of the back plate 806, a cradle, and/or a case housing the computing device. Additionally or alternatively, the solar panels 810 may be mounted on the back plate 806, the cradle, and/or a case housing the computing device.

In some embodiments, one or more batteries of a computing device mounted to the airframe may additionally be recharged via one or more of the above-mentioned systems or methods. For example, the computing device coupled to the airframe may be connected to the UAV 800 via a USB or similar cable. The UAV 800 may transfer electricity generated via the extended arm 802, solar panels 810, and the like, to the one or more batteries of the computing device.

Illustrative Environment

Figure 9:
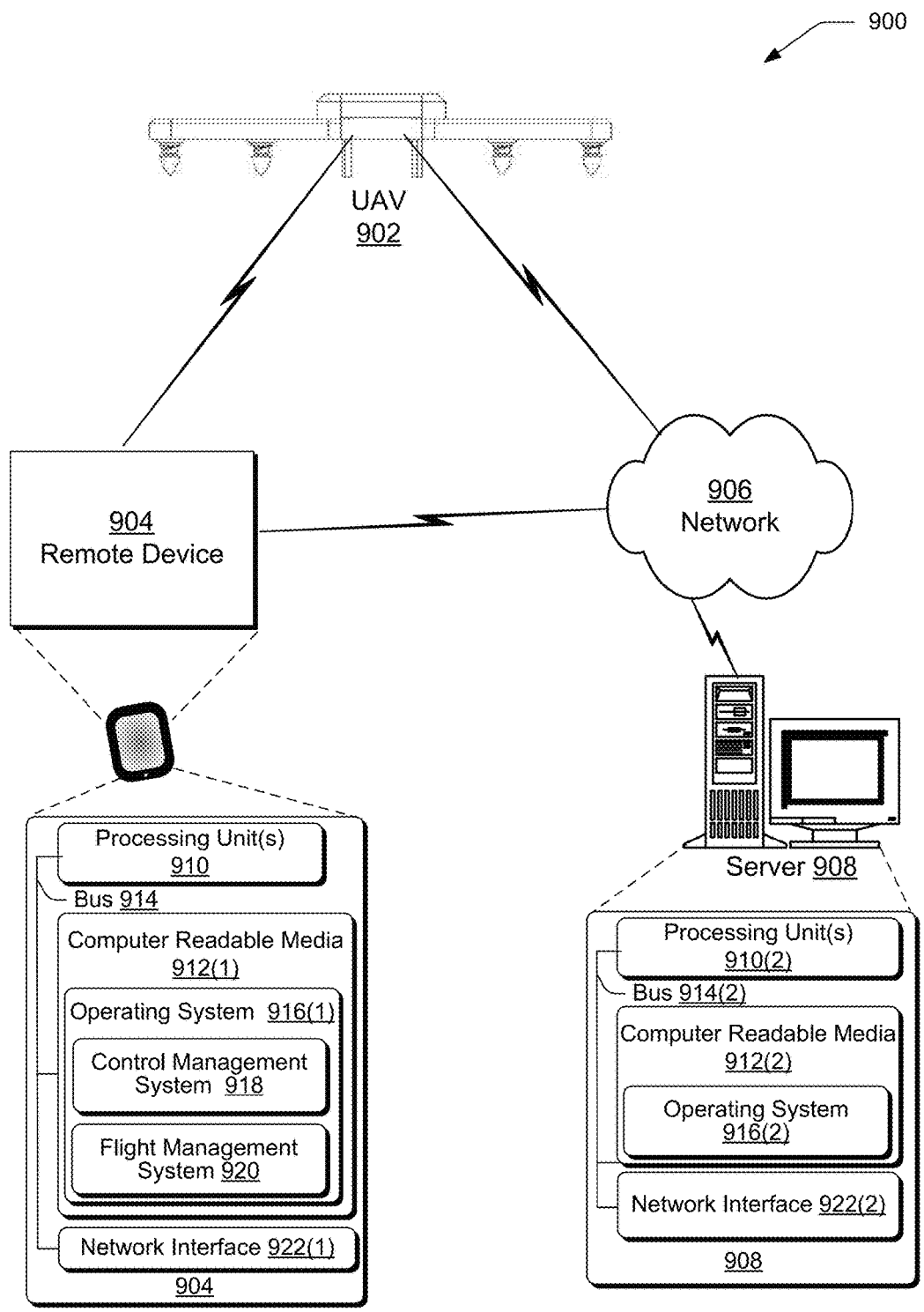
FIG. 9 is an illustrative environment in which the UAV shown in FIG. 1 may operate.
Figure 10:
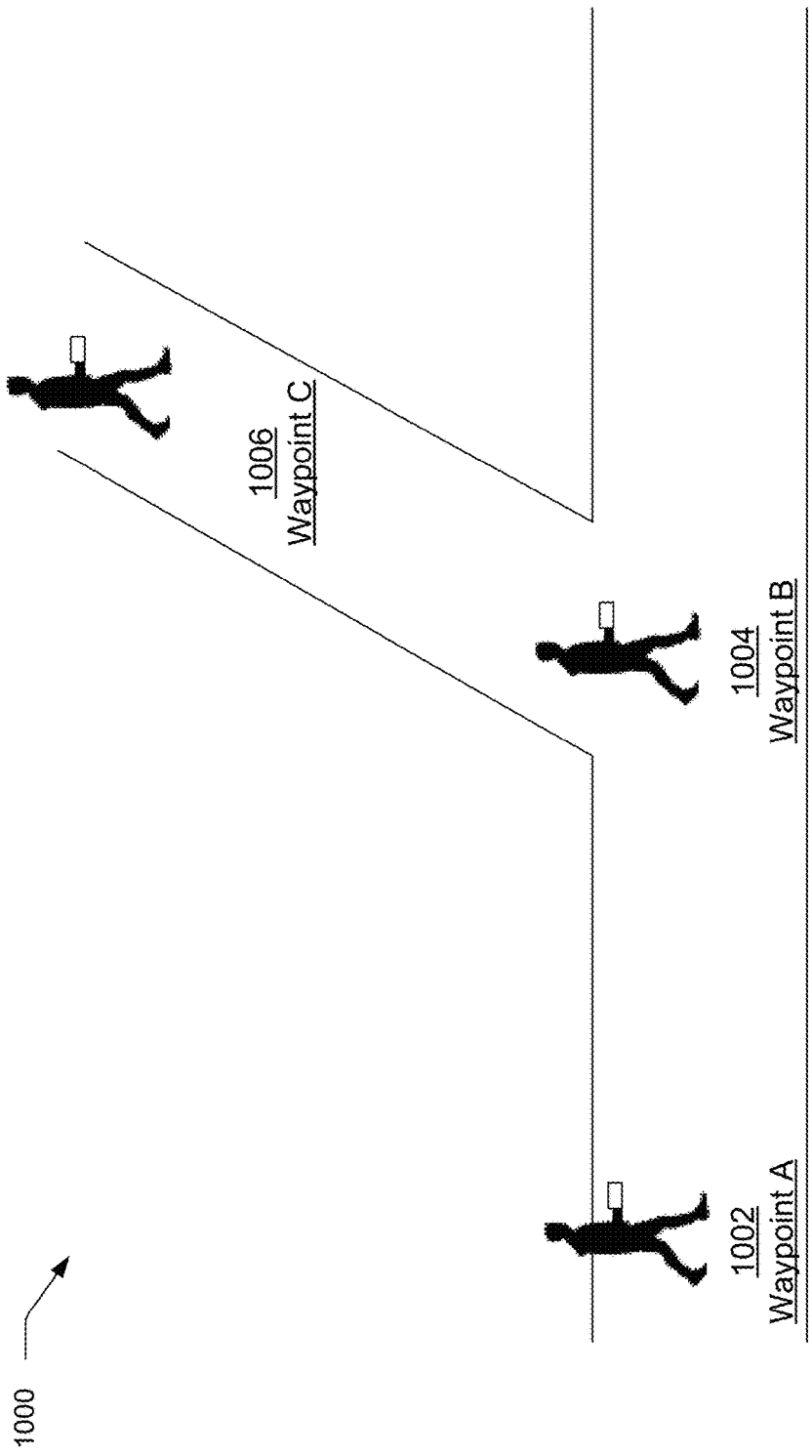
FIG. 10 depicts a manual waypoint input setting in a global positioning system (GPS), or other positioning system environment.
Figure 11:
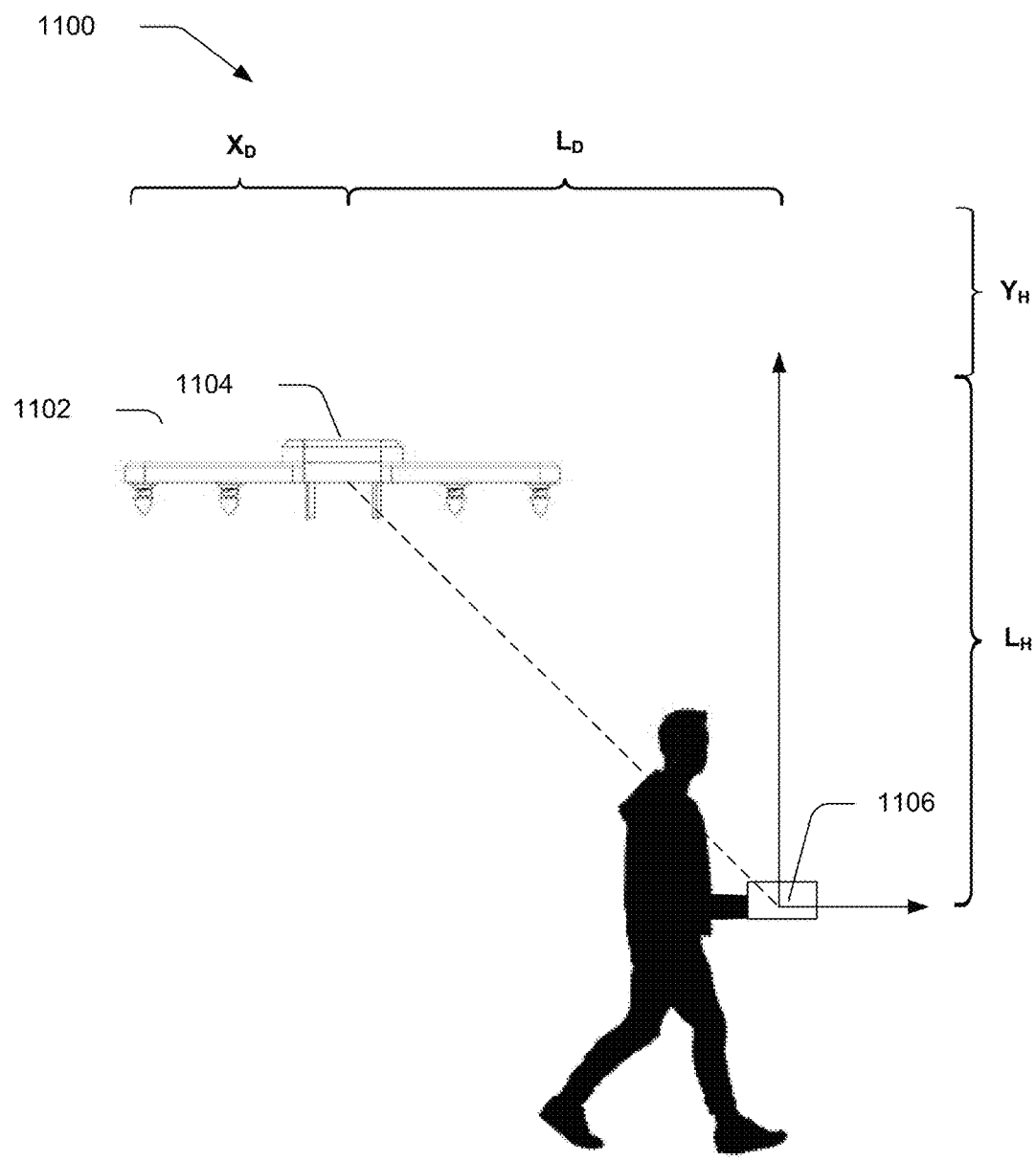
FIG. 11 depicts a follow-me setting in a GPS, or other positioning system environment.
Figure 12:
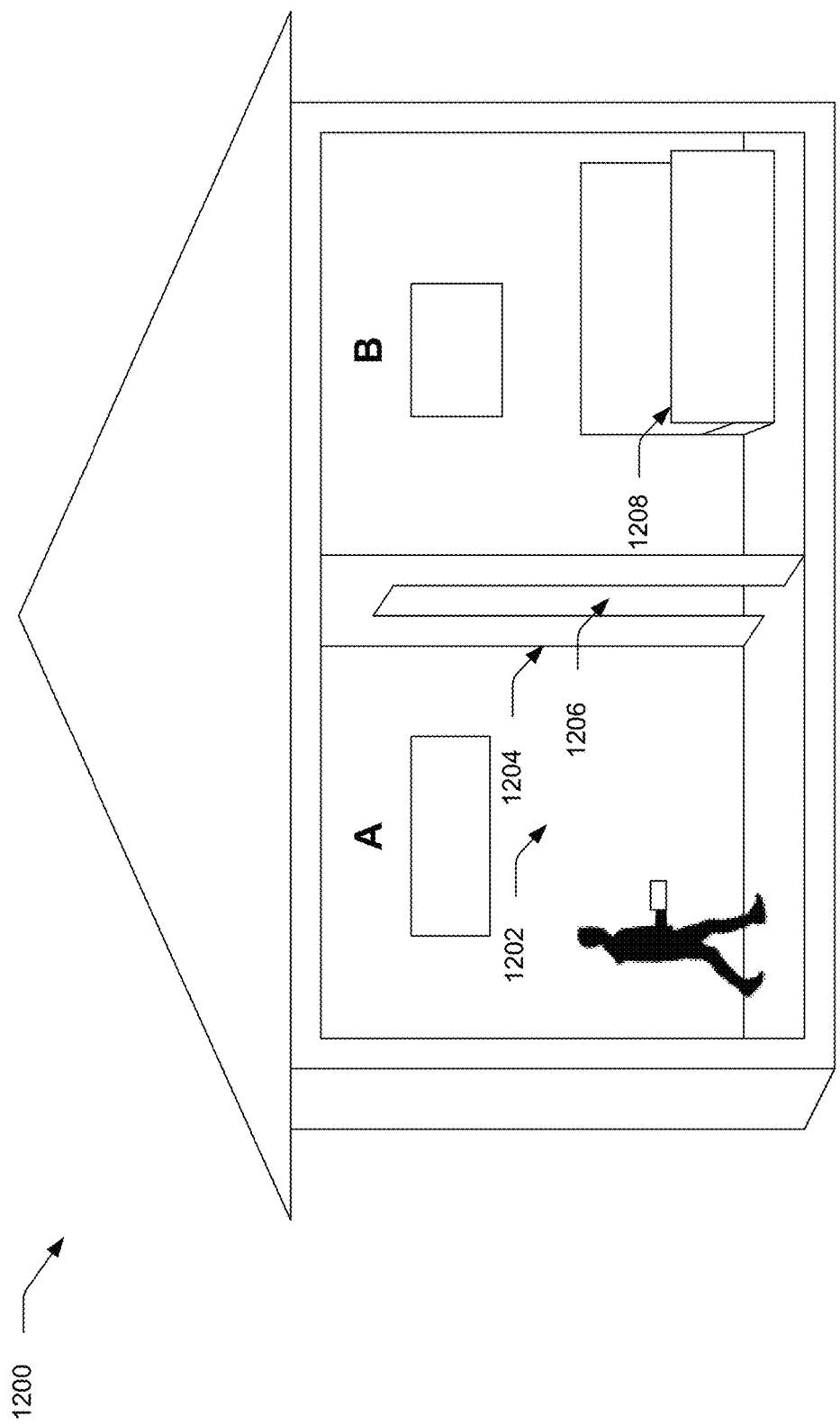
FIG. 12 depicts a manual waypoint input setting in a GPS denied environment.

FIGS. 9-12 depict illustrative environments in which a UAV, such as UAV 100 may be used. FIGS. 10-12 illustrate methods in which a flight plan may be created. The methods depicted herein are not intended to be exclusive, but instead provide illustrations of creating a flight plan and saving it to the UAV, the flight computing device, the secondary computing device, and/or a server.

FIG. 9 is an illustrative environment in which the UAV, such as UAV 100 may operate. The environment described below constitutes but one example and is not intended to limit the claims to any particular operating environment. Other environments can be used without departing from the spirit and scope of the claimed subject matter.

FIG. 9 shows an example environment 900 in which UAV 902 may operate. UAV 902 may comprise a computing device, such as computing device 104. Remote device 904 and/or components of environment 900, such as server 908, may include a diverse variety of device types configured to communicate via one or more networks 906, and are not limited to any particular type of device. In some examples, remote device 904 and/or server 908 may include stationary devices, including but not limited to servers, desktop computers, personal computers, network-enabled televisions, terminals, game consoles, set-top boxes, gaming devices, work stations, and thin clients, such as those capable of operating a distributed computing resource. In some examples, remote device 904 and/or server 908 may include mobile devices, including but not limited to mobile phones, tablet computers, mobile phone tablet hybrids, personal data assistants (PDAs), laptop computers, media players, personal video recorders (PVRs), cameras, and any other mobile computers or any other mobile telecommunication devices. In some examples, remote device 904 and/or server 908 may include embedded devices, including but not limited to wearable computers, implanted computing devices, automotive computers, computer navigation type devices, such as satellite-based navigation systems including global positioning system (GPS) devices and other satellite-based navigation system devices, appliances, and integrated components for inclusion in a computing device. In various examples, remote device 904 and/or server 908 may include any other sort of computing device configured to communicate via one or more networks 906.

For example, network 906 may include public networks such as the Internet, private networks such as an institutional and/or personal intranet, or some combination of private and public networks. Network 906 may also include any type of wired and/or wireless network, including but not limited to local area networks (LANs), wide area networks (WANs), personal area networks (PANs), body area networks (BANs), near field communication (NFC), satellite networks, cable networks, Wi-Fi networks, WiMax networks, mobile communications networks (e.g., 3G, 4G, and so forth) or any combination thereof. Network 906 may utilize communications protocols, including packet-based and/or datagram-based protocols such as internet protocol (IP), transmission control protocol (TCP), user datagram protocol (UDP), or other types of protocols. Moreover, network 906 may also include a number of devices that facilitate network communications and/or form a hardware basis for the networks, such as switches, routers, gateways, access points, firewalls, base stations, repeaters, backbone devices, and the like.

In some examples, network 906 may further include devices that enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

Remote device 904 and server 908 may include any computing device having one or more processing unit(s) 910 operably connected to computer-readable media 912 such as via a bus 914, which in some instances can include one or more of a system bus, a data bus, an address bus, a PCI bus, a Mini-PCI bus, and any variety of local, peripheral, and/or independent buses. Executable instructions stored on computer-readable media 912 may include, for example, an operating system 916, a control management system 918, a flight management system 920 and/or other modules and programs that are loadable and executable by processing units(s) 910.

The operating system 910 on remote device 904 and/or server 908 may be any operating system including but not limited to MICROSOFT WINDOWS, WINDOWS PHONE, QNX™, IBM z/OS™, LINUX, ANDROID, iOS™, OS X™, NETBSD™, or any other operating system capable of managing computer hardware and software resources. In some examples, remote device 904 and server 908 may include operating system 916, such as MICROSOFT WINDOWS. In various examples, remote device 904 may include operating system 916(1) such as a MICROSOFT WINDOWS, while server 908 may include operating system 916(2), such as ANDROID.

Additionally or alternatively, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Remote device 904 and/or server 908 may also include one or more network interface(s) 922 to enable communications between remote device 904, server 908, and the UAV. Such network interface(s) 922 may include one or more network interface controllers (NICs) or other types of transceiver devices to send and receive communications over a network. For example, network interface(s) 922 may include proximity interfaces to further enable communications between remote device 904, server 908, and the UAV. Such proximity interfaces can include one or more proximity network interface controllers or other types of transceiver devices to send and receive communications over a proximity network.

Communication between the remote device 904, server 908, and the UAV 902 may be possible via a wired or a wireless signal, including but not limited to, Bluetooth, radio control, voice control, electromagnetic waves, Wi-Fi signals, cell phone signals, or some combination thereof. Remote device 904 may send the signals via network 906 to the control management system 918, such as control management system 216. Upon receiving the signals, control management system 918 may adjust the motor speed, rotor speed, and/or rotor pitch as necessary to reflect the desire of the remote device 904.

In various embodiments, UAV 902 may be configured to fly autonomously based upon flight plan data stored in a computing device, such as computing device 104 and/or a control management system, such as control management system 216. The UAV 902 may be configured to update positioning data to the remote device 904 via network 906. In such embodiments, a user may track the position of the UAV 902 throughout the flight plan, and alter the flight plan via the control management system 918 and/or the flight management system 920 in remote device 904, as necessary.

Additionally or alternatively, the UAV 902 may fly a flight plan based upon proximity to remove device 904, such as in a follow-me mode. In such embodiments, UAV 902 may maintain a distance and/or altitude from remote device 904 based upon distance input communicated via network 906.

FIG. 10 depicts a manual waypoint input setting in a global positioning system (GPS), or other positioning system environment.

As discussed above, a flight plan may be input into a flight management system on a computing device, such as flight management system 412, by entering one or more waypoints prior to flight. Additionally or alternatively, a flight plan, or the waypoints thereof, may be input directly into the UAV, such as via the control management system or other onboard computer.

Each of the waypoints may correspond to a latitude and longitude, a street address, or a position on a grid. The flight plan may be manually generated by inputting position information for one or more waypoints. The flight plan may also be input by downloading a pre-set series of waypoints from a server.

At position 1002, a user, located at Waypoint A enters the position data of Waypoint A. In some embodiments, a waypoint or other button on the computing device may be selected to instruct the computing device to save the waypoint position data. The waypoint position data may be determined based upon GPS input, or other positioning system input at the position. Once selected, the computing device may save the position data for the corresponding waypoint. In some embodiments, the address at Waypoint A may be entered into the flight management system.

At positions 1004 and 1006, the position data for Waypoints B and C may be entered into the flight management system. The flight management system may save Waypoints A, B, and C as a flight plan, and later transmit the flight plan to the control management system to fly a route corresponding to Waypoints A, B, and C.

In various embodiments, the flight management system may save the waypoints for later access and flight plan building at a later time. For example, another flight plan may include Waypoints A and B, and not include Waypoint C. For yet another example, Waypoint B may comprise a particular point of interest, and thus another flight plan may have the UAV fly directly to Waypoint B, and hover and/or loiter around Waypoint B. In such an example, the flight management system may receive input to maintain a maximum and/or minimum distance from a waypoint while in the loiter mode.

Additionally or alternatively, a waypoint, such as Waypoint B, may be set such that the UAV may be launched to loiter at a particular altitude. Waypoint B may comprise a location in a remote area, such as the woods, with limited or no network connection. Thus, a user may set the current position of the UAV as Waypoint B, and subsequently launch the UAV to loiter in and around Waypoint B at a set altitude. The altitude may be pre-determined prior to take-off. In some embodiments, the UAV may climb until it reaches an altitude at which it may connect to a network. In such embodiments, the UAV may comprise a maximum altitude setting to ensure safety of the UAV and other aircraft. For example, a user hiking in the woods may launch the UAV over a position, thereby allowing the user to connect to a network and send a distress signal. For another example, the user may connect to a network to send and/or receive email or other messages.

FIG. 11 depicts an illustrative follow-me setting, which may be employed in a global positioning system (GPS) environment and/or a GPS denied environment.

In various embodiments, UAV 1102 may be configured to fly in a follow-me mode. In the follow-me mode, computing device 1104 may be configured to maintain a distance $L_d$ and/or altitude $L_h$ from a remote device 1106. The follow-me mode may be set as a flight plan in the computing device 1104, the remote device 1106, and/or a control management system onboard UAV 1102.

In various embodiments, the settings of the follow-me mode may be pre-determined by the flight management system and/or control management system. In such embodiments, the UAV 1102 may maintain a set distance and altitude from the remote computing device 1106 throughout the flight plan.

In some embodiments, the settings of the follow-me mode may be adjustable via input into the flight management system and/or control management system. In such embodiments, a user may set a desired distance $L_d$ and/or altitude $L_h$ between the UAV 1102 and the remote computing device 1106. In some embodiments, the flight management system and/or the control management system may apply a pre-determined variation to the distance $L_d$ and/or altitude $L_h$. In some embodiments, the user may set the allowed variation factor, such as plus or minus a distance $X_d$ and/or plus or minus an altitude $Y_h$. In such embodiments, the UAV may decrease the battery usage in the follow-me mode because the proximity transmissions do not need to be as frequent.

In various embodiments, UAV 1102 and/or computing device 1104 may comprise a gesture sensing device. In such embodiments, the gesture sensing device may be configured to track the movement of a user and/or the remote computing device 1106. For example, the UAV 1102 may hover or loiter in an area until receiving an indication from the user and/or the remote computing device 1106 to instruct the UAV 1102 to proceed, such as a waving motion of a hand holding the remote computing device 1106.

Additionally or alternatively, the gesture sensing device may track the movements of the user holding the remote computing device 1106. Responsive to unusual movements, or a distress signal, the computing device 1104 may loiter above the user and/or remote computing device 1106, and activate one or more functionalities on computing device 1104. For example, if the gesture sensor receives a distress signal, computing device 1104 may automatically call 9-1-1 or other competent authority for assistance. For another example, the UAV 1102 may automatically record the incident via a camera on the computing device 1104 and/or a camera attached to or embedded in the UAV 1102.

FIG. 12 depicts a manual waypoint input setting in a GPS denied environment. In such an embodiment, a user may set the waypoints by inputting obstacles into the system and/or inputting waypoints for a particular flight. The inputs may be made via the UAV, the computing device attached to the UAV, and/or a remote device.

In various embodiments, obstacles and waypoints may be input into the flight management system and/or control management system by creating an indoor grid system. In such embodiments, the obstacles may be mapped out by an optical analysis or other analytical input, such as along the walls of a room. Additionally, waypoints may be mapped out, such as through doorways, windows, or other safe passageways. In some embodiments, obstacle free areas and/or altitudes may be set within a grid system to ensure collision avoidance.

Obstacle 1202 may be input into the flight management system and/or control management system. Obstacle 1202 may comprise a particular obstacle on a wall, such as a shelf, and/or the length of the wall. In various embodiments, the input may be via an ultrasonic sensor and/or distance sensor which may detect solid objects and determines a distance to fly from the solid objects. In some embodiments, the input may be via a camera, wherein the user takes a still photograph and/or video of the obstacle, and the flight management system uses image recognition to avoid the obstacle.

Obstacle 1204 may be input into the flight management system and/or control management system similar to Obstacle 1202. Obstacle 1204 may alert the system of an Obstacle oriented perpendicular to Obstacle 1202. Obstacle 1204 may comprise the wall up until Waypoint 1206. Waypoint 1206 comprises a safe passageway of travel in which no obstacles should be encountered. Thus, to safely fly from room A to room B, and vice versa, the UAV must pass through Waypoint 1206.

As depicted, room B comprises a bed. The bed, Obstacle 1208, may be input into the flight management system and/or control management system similar to Obstacles 1202 and 1204. Additionally, other furniture, both larger and smaller than Obstacle 1208 may be input into the UAV to avoid a collision.

Additionally or alternatively, the UAV may comprise sensors which track the location and distance to obstacles, allowing the UAV to fly in a see-and-avoid mode. In such embodiments, the UAV may avoid Obstacles 1202, 1204, and 1208, while safely navigating through Waypoint 1206, without prior flight plan input into the flight management system and/or control management system.

In various embodiments, the UAV may comprise a gesture control sensor, which tracks movements of a user and/or a remote device. In such embodiments, the user may direct the UAV to fly left, right, up, or down by, for example, waving a hand, or waving a remote device in the desired direction.

Figure 13:
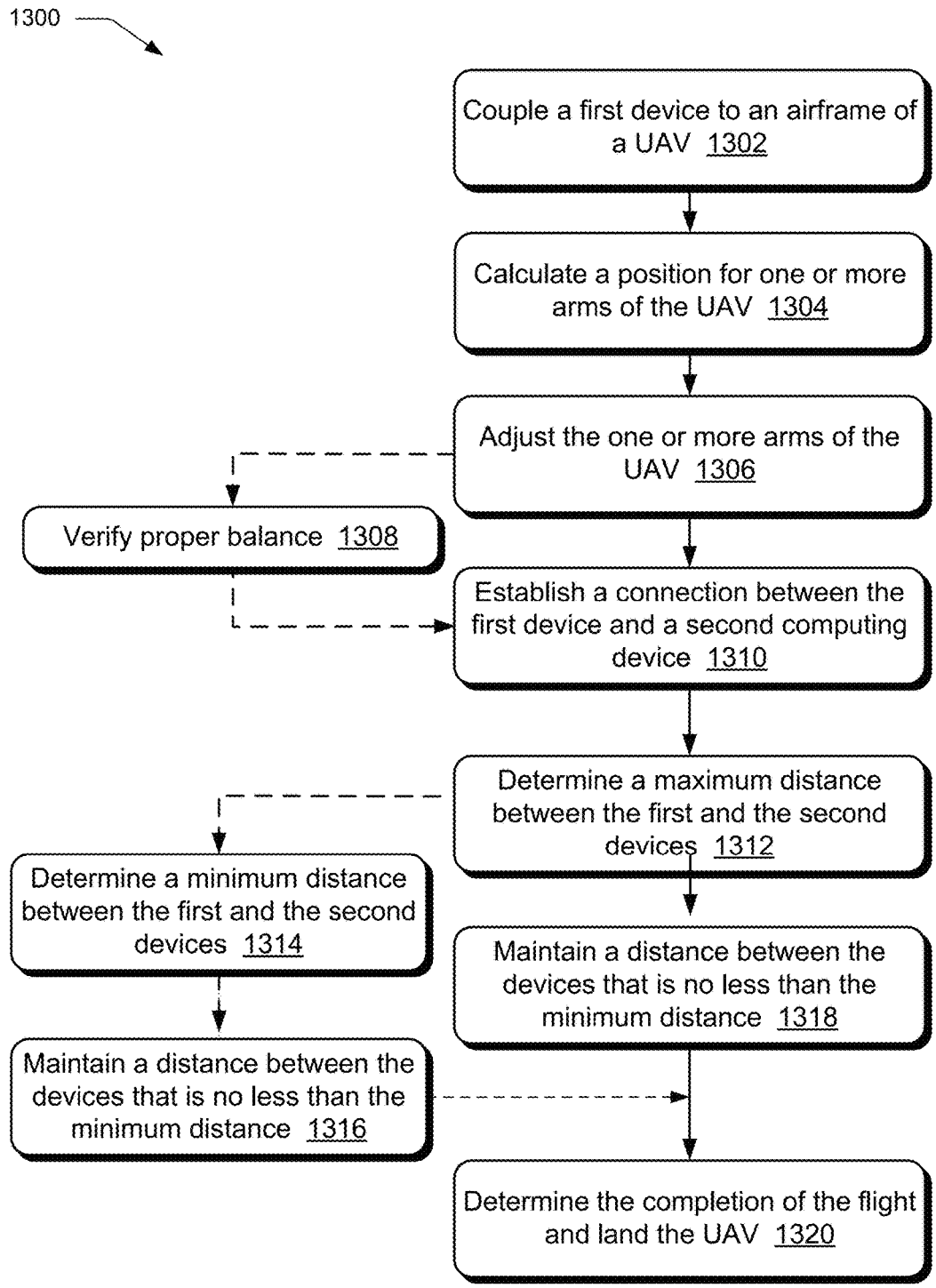
FIG. 13 is a flow diagram showing a process for adjusting the cradle and arms of a UAV, such as UAV 100.

FIG. 13 is a flow diagram showing a process for adjusting the cradle and arms of a UAV, such as UAV 100.

At block 1302, a computing device may be coupled to an airframe of the UAV. In some embodiments, a first computing device may be coupled to the airframe via a cradle. The cradle may secure the computing device into place via one or more adjustable and/or fixed clamps. In such embodiments, the clamps may secure around at least two outer edges or corners of the computing device. The clamps may be manually and/or automatically set into position to secure the computing device.

In various embodiments, the computing device may be housed in a case, the case being configured to attach to the cradle. In such embodiments, the case may attach to the cradle via one or more snap fits, latches, hooks, fixed and/or adjustable clamps, magnets, or the like.

At block 1304, the control management system may measure the weight distribution across the landing surfaces. Based at least in part upon the weight amount and distribution, the control management system may calculate positions for the one or more arms necessary to maintain balanced flight.

Additionally or alternatively, the computing device housed in the cradle may provide computing device data, such as dimensions, to the control management system. Upon receiving the dimensions, the control management system may automatically adjust the arms for the particular computing device. For example, the control management system may have the correct arm setting for an iPhone pre-loaded into its memory. For another example, the control management system may save data for particular devices, such as those commonly owned and/or used by a user of the UAV.

At block 1306, the control management system may adjust the arms of the UAV to various positions which will allow for balanced and stable flight.

At block 1308, the control management system may cause the UAV to launch into a hover, and verify proper balancing.

If the UAV is not sufficiently balanced, the control management system may determine the adjustments to be made to affect a balanced and stable hover. In various embodiments, the control management system may adjust the arms while airborne. In some embodiments, the landing surfaces of the UAV may comprise a weight-on-wheels switch, thereby disabling any arm movements while airborne.

At block 1310, the control management system and/or the flight management system may establish a connection between the first computing device and a second computing device. The connection may be wired and/or wireless.

At block 1312, the control management system and/or the flight management system may determine a maximum distance between the first and the second devices. In some embodiments, the maximum distance may be determined by an operator by operator input into the first and/or the second computing device. In some embodiments, the maximum distance may be a pre-determined distance as set by the control management system and/or the flight management system. For example, an application may set a maximum distance to fly in a follow-me mode.

At block 1314, the control management system and/or the flight management system may determine a minimum distance between the first and the second devices. In some embodiments, the minimum distance may be determined by an operator by operator input into the first and/or the second computing device. In some embodiments, the minimum distance may be a pre-determined distance as set by the control management system and/or the flight management system. For example, an application may set a minimum distance to fly in a follow-me mode.

At blocks 1314 and 1316, the control management system and/or the flight management system may maintain a distance between the first and the second computing devices based upon the maximum and/or minimum distances.

At block 1320, the control management system and/or the flight management system may determine that a flight plan is complete, and land the UAV. In some embodiments, the flight may be complete when a flight plan has been completed. In some embodiments, the flight may be complete when an operator sends a signal to the UAV via the first computing device, the control management system and/or the flight management system, directing the UAV to land.

Figure 14:
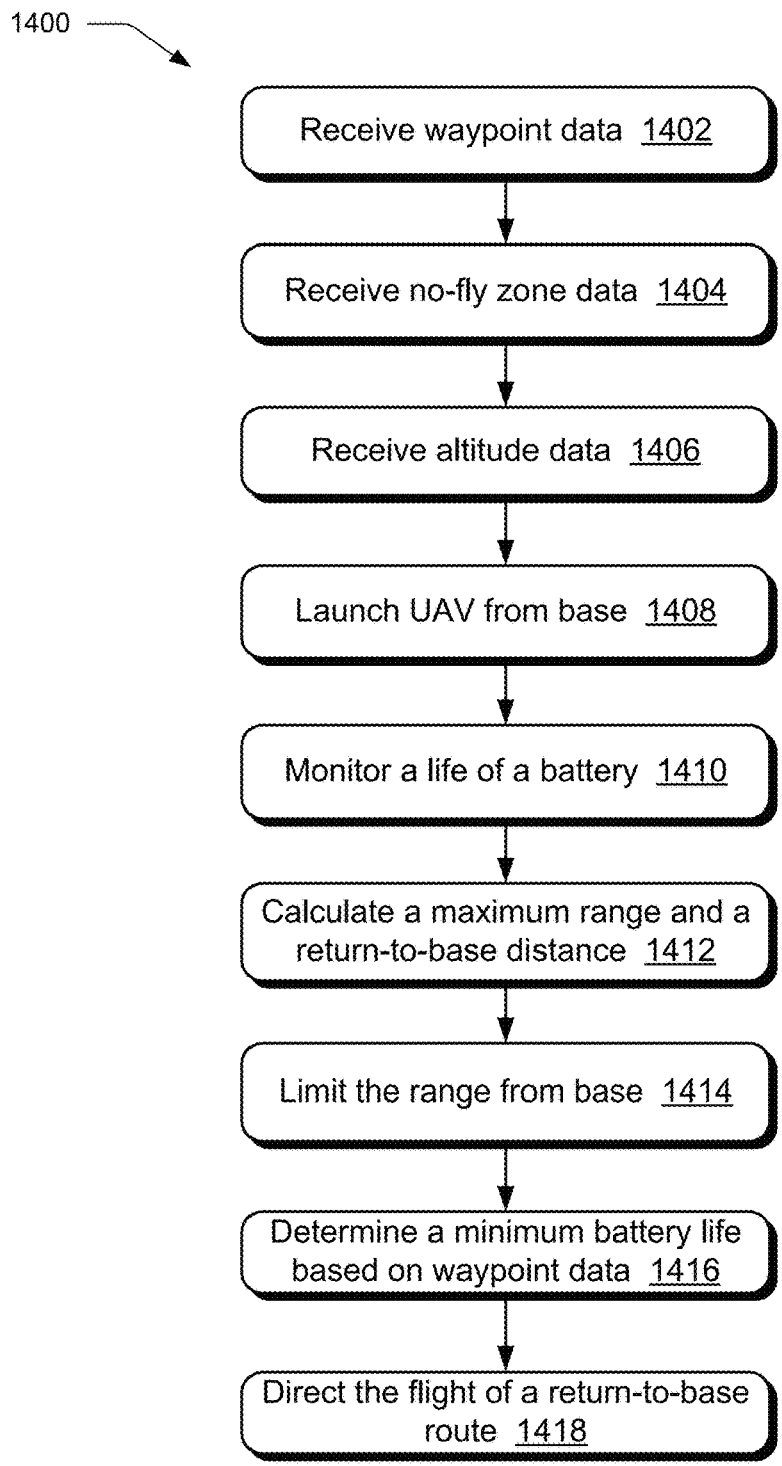
FIG. 14 is a flow diagram showing a process for outdoor flight-plan mapping in a GPS or other positioning system environment.

FIG. 14 is a flow diagram showing a process for outdoor flight plan mapping. The flight plan may be mapped to and stored in a flight management system of a computing device coupled to a UAV, a flight management system of a remote device, and/or the control management system embedded in and/or attached to the UAV.

At block 1402, the flight management system and/or control management system receives waypoint data. The waypoint data may entered by a latitude and longitude, a grid input, an address, or any other method of entering position data.

At block 1404, the flight management system and/or control management system receives no-fly zone data. In various embodiments, the flight management system and/or control management system may download no-fly zone data from a remote service, such as the Federal Aviation Administration. In such embodiments, the remote service may connect to the flight management system and/or the control management system via a network, and download the most up-to-date flight restrictions for a local area of the UAV. For example, when the President flies, restricted areas may exist for limited time periods. Thus, the UAV may receive input, through the flight management system and/or control management system, that flight is not authorized in a particular area. In such embodiments, the computing device on the UAV and/or the remote computing device may provide an indication to the user that flight is not authorized. In some embodiments, the UAV may be automatically disabled from flight when it is located in a no-fly zone.

In various embodiments, the flight management system and/or control management system may store no-fly zone inputs provided by the user. For example, if the user does not want the UAV to overfly a pool, the user may input the latitude and longitude coordinates of the pool, and designate a no-fly zone in a 30 foot radius around the coordinates of the pool.

At block 1406, the flight management system and/or control management system receives altitude data. In various embodiments, the altitude data may comprise a pre-determined altitude, based on the type of flight plan. For example, if the flight plan is downloaded from a server, the altitude data may already be preloaded. For another example, if the flight plan is one that was previously set, the altitude may be pre-loaded. In some embodiments, the altitude data may comprise a pre-determined variation, such that the altitude setting is a plus or minus value. In some embodiments, the user may input the altitude and/or the variation data.

At block 1408, the UAV may launch from a base location, and fly the flight plan. In some embodiments, the base location may comprise a fixed point, such as the launch latitude and longitude. In some embodiments, the base location may be mobile, such as with a landing pad or a connection with a remote device.

At block 1410, the flight management system and/or control management system may monitor the battery life of the UAV and/or computing device. In various embodiments, the flight management system and/or control management system may transmit the state of the battery life of the UAV and/or the computing device to a remote device of an operator.

At block 1412, the flight management system and/or control management system may calculate a maximum range and/or a return-to-base distance based on the battery life of the UAV. In some embodiments, the flight management system and/or the control management system may calculate the maximum range and/or return-to-base distance. In some embodiments, the flight management system and/or the control management system may transmit the maximum distance and/or return-to-base distance to a remote device of an operator. In various embodiments, the flight management system and/or the control management system may calculate a return-to-base route for the UAV to fly. In such embodiments, the return-to-base route may be the most direct route to the base location, accounting for no-fly zone restrictions.

At block 1414, the flight management system and/or the control management system may limit the range from the base based upon the maximum range and/or return-to-base distance calculated in at 1412.

At block 1416, the flight management system and/or the control management system may determine a minimum battery life based on waypoint data. In such embodiments, the flight management system and/or the control management system may provide a warning to a remote device that a flight plan is not viable based upon the battery life of the UAV and/or computing device. In some embodiments, the minimum battery life comprises the minimum battery power required to safely land the UAV at the base location. In some embodiments, the minimum battery life comprises the minimum battery power required to safely land the UAV at a safe location, other than a base location. A safe location may be one or more designated addresses, latitude and longitude positions, or a known waypoint.

At block 1418, the flight management system and/or the control management system, based upon the determined battery life, may direct the flight of a return-to-base route. The return-to-base route may be a direct route to the base location and/or a shortest distance taking into account no-fly zones to a base location or an alternate pre-designated landing spot and/or safe landing area. The return-to-base function may provide a safety mechanism to ensure that the UAV and/or computing device will not deplete battery resources before safely landing.

Figure 15:
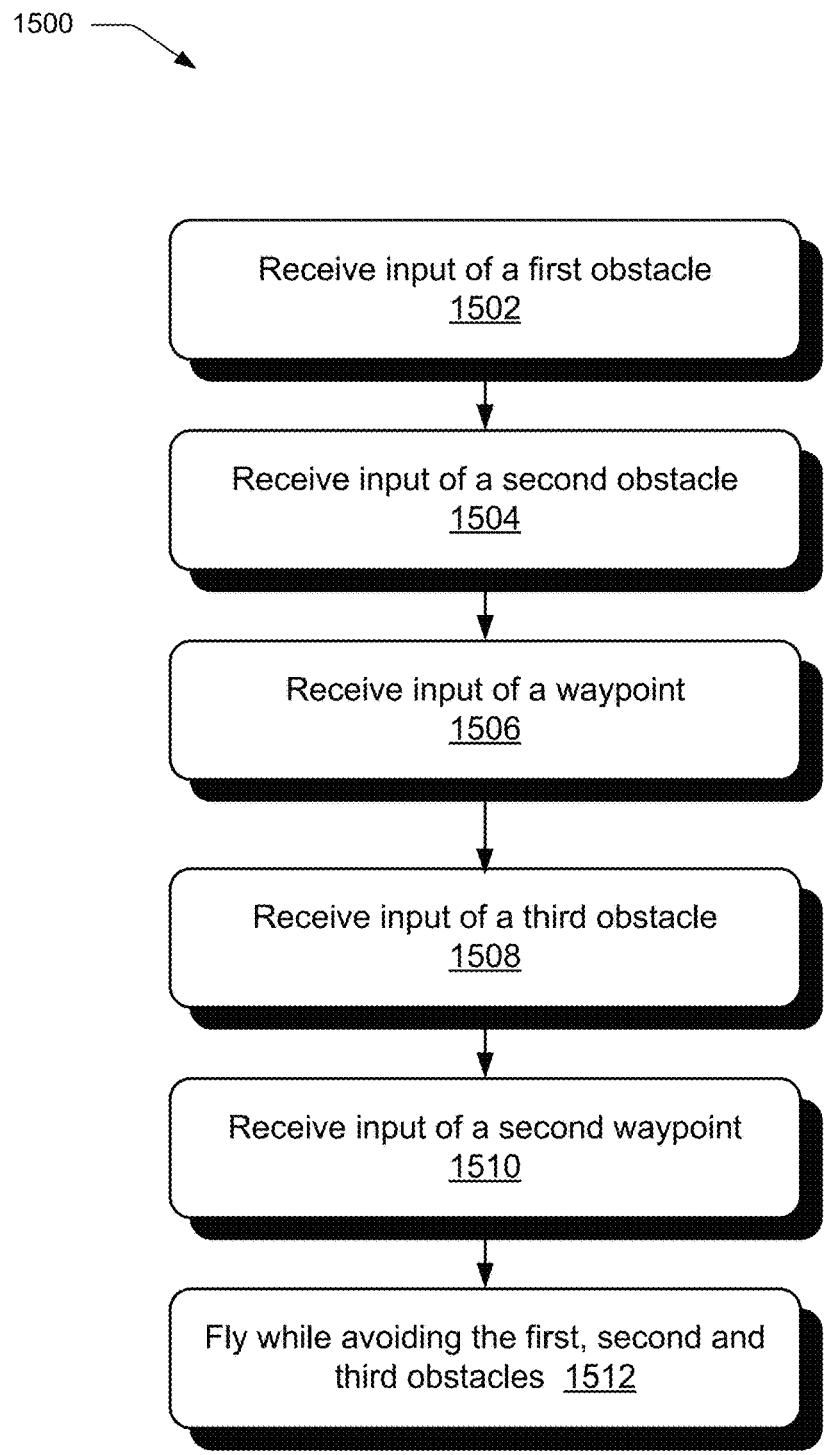
FIG. 15 is a flow diagram showing a process for indoor flight-plan mapping in a GPS denied environment.

FIG. 15 is a flow diagram showing a process for indoor flight-plan mapping.

At block 1502, the control management system and/or the flight management system receives input of a first obstacle. As described above, the obstacle may comprise an individual object, or the length of a wall. In various embodiments, the obstacle may be input by still camera, video, distance sensors, ultrasonic sensors, and the like.

At block 1504, the control management system and/or the flight management system receives input of a second obstacle.

At block 1506, the control management system and/or the flight management system receives input of a waypoint. The waypoint may any point in which the UAV may safely travel to avoid one or more obstacles.

At block 1508, the control management system and/or the flight management system receives input of a third obstacle.

At block 1510, the control management system and/or the flight management system receives input of a second waypoint.

At block 1512, the control management system and/or the flight management system may cause the UAV to launch and fly between the waypoints while avoiding the first, second, and third obstacles.

Additionally or alternatively, the obstacles may be recognized by one or more sensors during flight, such as in a see-and-avoid mode. Thus, the UAV may fly between waypoints, while avoiding the obstacles.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Conditional language such as, among others, "can," "could," "might" or "may," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

What is claimed is:

1. An unmanned aerial vehicle (UAV) comprising:
   an airframe comprising:
      a plurality of arms movable between a stowed configuration and a flight-ready configuration;
      a plurality of rotors, each coupled to a respective one of the plurality of arms;
      at least one motor coupled to the plurality of rotors; and
      a control management system;
   a cradle coupled to the airframe for receiving a computing device, the cradle being adjustable to accommodate a plurality of different computing devices; and
   a connector configured to connect the control management system to the computing device.

2. The UAV of claim 1, wherein the control management system is configured to:
   adjust a position of the cradle with respect to the airframe, adjust a position of the plurality of arms, or a combination thereof, and wherein the adjustment is based at least in part on a balance input from the control management system, the balance input responsive to a relative position of the computing device with respect to the airframe.

3. The UAV of claim 1, wherein the computing device comprises at least one of:
   a smart phone;
   a tablet; or
   an MP3 player.

4. The UAV of claim 1, further comprising at least one actuator configured to adjust the plurality of arms.

5. The UAV of claim 1, wherein the plurality of arms are adjustable in a range from 0 degrees to 210 degrees.

6. The UAV of claim 1, the airframe further comprising one or more attachment modules, wherein the one or more attachment modules are configured to house one or more detachable components.

7. The UAV of claim 6, wherein the one or more detachable components include one or more of:
   a camera;
   a strobe light;
   an LED light;
   an accelerometer;
   a gyroscope;
   a pressure sensor;
   a position tracker;
   a gesture sensor; or
   an ultrasonic sensor.

8. The UAV of claim 1, wherein the control management system processes input from the computing device and adjusts the plurality of rotors to keep the UAV level.

9. The UAV of claim 1, wherein the control management system processes input from the computing device and adjusts the plurality of rotors to maintain a programmed flight path.

10. The UAV of claim 1, wherein the plurality of arms are fully retracted when in the stowed configuration.

11. The UAV of claim 10, wherein at least some of said plurality of arms are configured differently.

12. The UAV of claim 11, wherein said plurality of arms includes first and second pairs that are configured congruently with one another, and wherein arms within said first pair are sized or shaped differently than arms in said second pair.

13. An unmanned aerial vehicle (UAV) comprising:
   an airframe, comprising:
      at least one arm movable between a stowed orientation and a flight-ready orientation;

at least one rotor coupled to the at least one arm;
at least one motor coupled to the at least one rotor; and
a flight control management system;
a cradle coupled to the airframe for accommodating a computing device; and
a connector configured to connect the flight control management system to the computing device.

14. The UAV of claim 13, wherein the cradle is an adjustable cradle for accommodating a plurality of differently sized computing devices.

15. The UAV of claim 13, further comprising a computing device removably coupled to the cradle.

16. The UAV of claim 13, further comprising a plurality of arms each movable between a respective stowed orientation to a flight ready orientation.

17. The UAV of claim 16, wherein the plurality of arms are nested together when in the stowed orientation.

18. The UAV of claim 13, wherein at least some of said plurality of arms are configured differently.

19. The UAV of claim 18, wherein first and second pairs of said plurality of arms are configured congruently with one another, and wherein arms within said first pair are larger than arms in said second pair.

20. The UAV of claim 13, further comprising a battery, wherein the UAV is configured to:
monitor a life of the battery;
calculate a return-to-base distance based at least in part on a distance to a base and the life of the battery; and
provide a return-to-base route at the return-to-base distance.

21. The UAV of claim 13, wherein the computing device comprises a flight plan, the flight plan being one or more waypoints.

22. The UAV of claim 13, wherein the flight control management system is configured to:
adjust a position of the cradle with respect to the airframe, or adjust a position of the at least one arm, and wherein the adjustment is based upon a balance input from the flight control management system.

23. The UAV of claim 13, wherein the computing device comprises at least one of:
a smart phone;
a tablet; or
an MP3 player.

24. The UAV of claim 13, wherein the computing device provides one or more waypoints and is configured to send signals associated with the one or more waypoints to the flight control management system, and responsive to receiving the signals associated with the one or more waypoints, the flight control management system directs the UAV to the one or more waypoints.

25. The UAV of claim 13, wherein the flight control management system is configured to:
receive an input from an ultrasonic sensor, the input comprising at least a distance to an obstacle;
calculate a closest point of approach to the obstacle based at least in part on a speed of the UAV and a route of flight;
determine a deviation in the route of flight necessary to avoid the obstacle;
responsive to the determination, deviate from the route of flight to avoid the obstacle; and
responsive to the obstacle avoidance, resume the route of flight.

26. The UAV of claim 13, wherein the flight control management system is configured to:
receive a plurality of inputs from an ultrasonic sensor, the plurality of inputs indicating a plurality of obstacles; and
calculate a route of flight based at least in part on the plurality of inputs, wherein the route of flight avoids the plurality of obstacles.

* * * * *